United States Patent
Fujiwara et al.

(10) Patent No.: US 7,912,481 B2
(45) Date of Patent: Mar. 22, 2011

(54) RECEIVER, RECEIVER FOR POSITIONING SYSTEM USING THE SAME, AND POSITIONING METHOD

(75) Inventors: Ryosuke Fujiwara, Kodaira (JP); Kenichi Mizugaki, Kodaira (JP); Masayuki Miyazaki, Tokyo (JP)

(73) Assignee: Hitachi Ltd., Tokyo (JP)

( * ) Notice: Subject to any disclaimer, the term of this patent is extended or adjusted under 35 U.S.C. 154(b) by 937 days.

(21) Appl. No.: 11/767,560

(22) Filed: Jun. 25, 2007

(65) Prior Publication Data

US 2008/0075151 A1    Mar. 27, 2008

(30) Foreign Application Priority Data

Sep. 27, 2006    (JP) .................................. 2006-262104

(51) Int. Cl.
*H04W 24/00* (2009.01)
*H04M 11/04* (2006.01)

(52) U.S. Cl. ................. 455/456.1; 455/456.3; 455/404.1

(58) Field of Classification Search ............... 455/456.1, 455/456.5, 404.2, 414.2; 342/450–465; 340/988–996
See application file for complete search history.

(56) References Cited

U.S. PATENT DOCUMENTS

| | | | |
|---|---|---|---|
| 6,459,402 B1 | 10/2002 | Tsunehara et al. | |
| 2004/0002347 A1 | 1/2004 | Hoctor et al. | |
| 2004/0235499 A1 | 11/2004 | Tanaka et al. | |
| 2005/0130669 A1 | 6/2005 | Mizugaki et al. | |
| 2005/0140543 A1 | 6/2005 | Tsunehara et al. | |

FOREIGN PATENT DOCUMENTS

| | | |
|---|---|---|
| EP | 1 396 730 A | 3/2004 |
| EP | 1 480 369 A | 11/2004 |
| JP | 2002-014152 A | 1/2002 |
| JP | 2003-273778 A | 9/2003 |

OTHER PUBLICATIONS

Ogino et al., "Integrated Wireless LAN Access System (1): Study on Location System", 2003 Lecture-Publication archives, Institute of Electronics, Information and Communication Engineers IEICE, B-5-203, p. 662.

Mizugaki et al., "3nw/bps Low Power UWB System (6): Study on Location System within 30 cm Error", 2005 Society Conference Lecture/Publication archives, Institute of Electronics, Information and Communication Engineers IEICE, A-5-15, p. 139.

Fujiwara et al, "Rapid signal acquisition for low-rate carrier-based ultra-wideband impulse radio", IEEE Symposium on Circuits and Systems, Kobe, Japan, May 2005, pp. 4497-4500.

Vincent Coli, "UWB technology for location-aware networking", RF Design, pp. 36, 38, 40, 42, 44, 46, Nov. 2003, vol. 26, No. 11, Primedia Business Magazines & Media, Overland Park, KS.

*Primary Examiner* — Charles N Appiah
*Assistant Examiner* — Emem Stephen
(74) *Attorney, Agent, or Firm* — Miles & Stockbridge P.C.

(57) ABSTRACT

An invention for estimating the first path of an arrival signal by a method and device with a simple structure and lower power consumption. In this method, the nominal pulse repetition frequency or its integer multiple are A/D converted at a frequency less than the multiplicative inverse of the pulse width, the AD conversion timing is offset by time resolution Δt and the receive signal measured, data stored in a RAM, and the first path output time is estimated based on sequentially rearranging of the stored waveform data.

16 Claims, 21 Drawing Sheets

DATA PRIOR TO MATCHING FILTER INPUT

DATA AFTER MATCHING FILTER INPUT
(COMPOSITE OUTPUT)

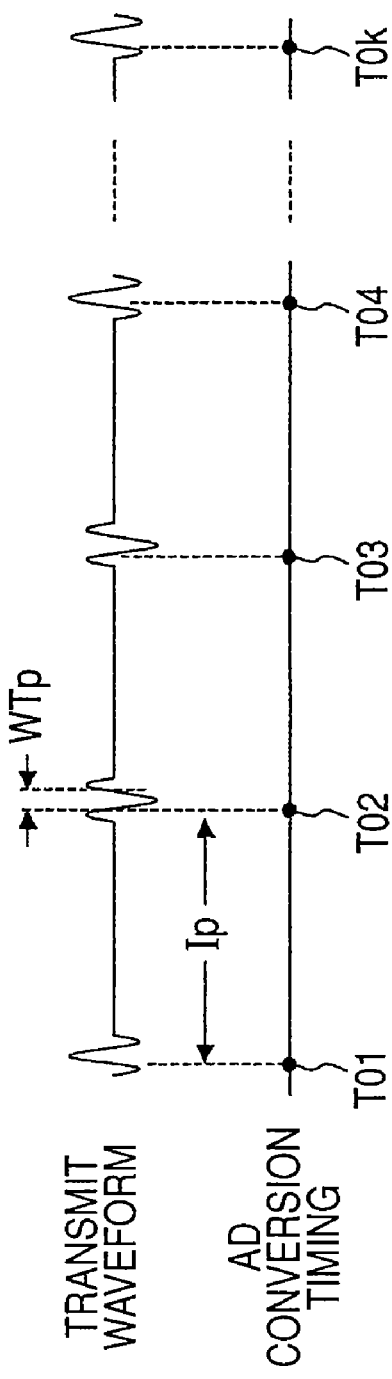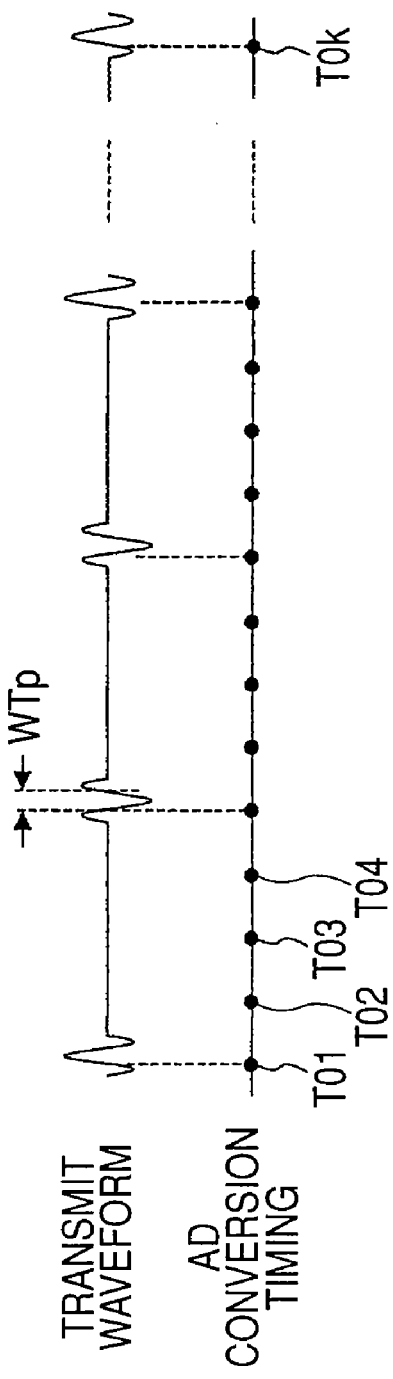

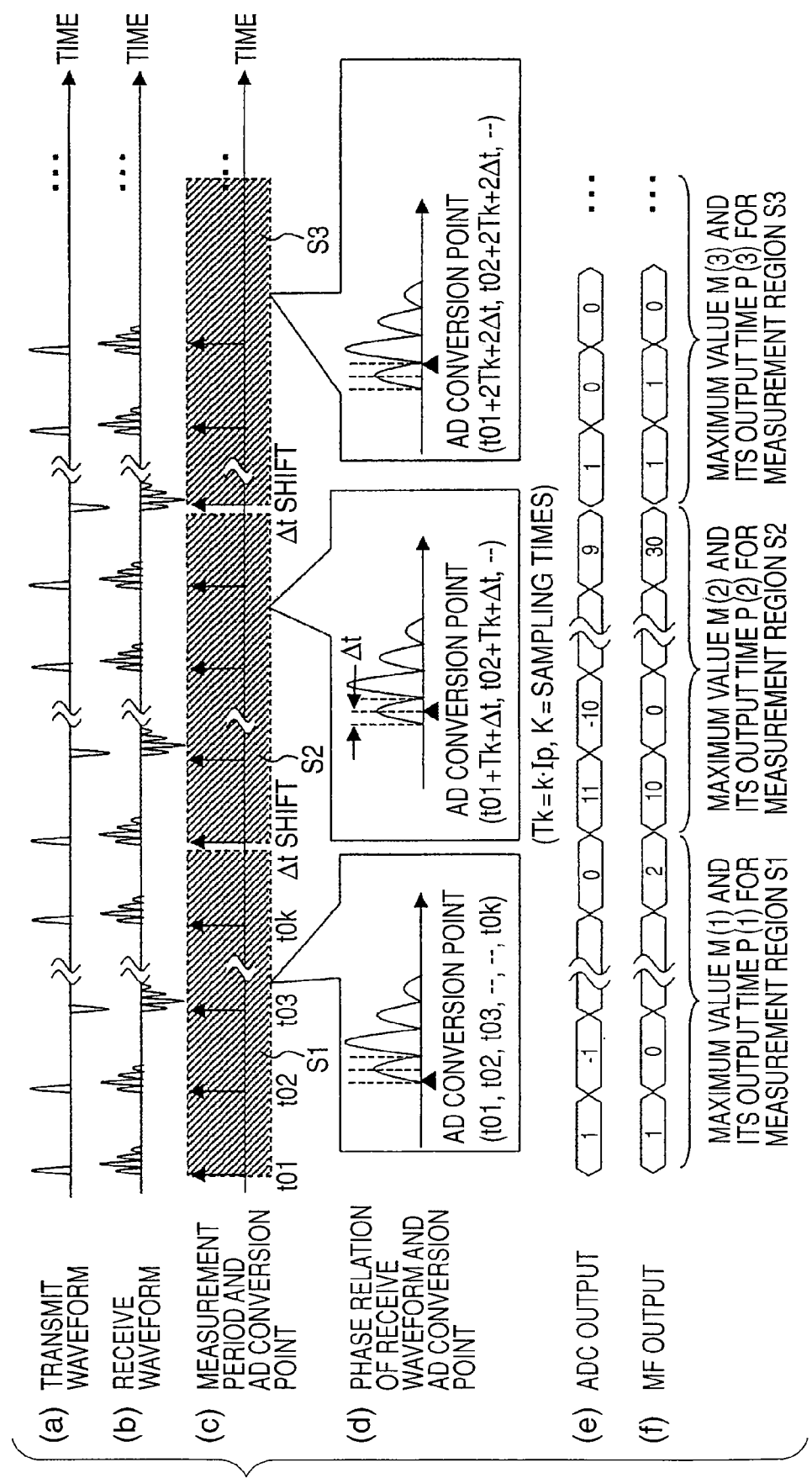

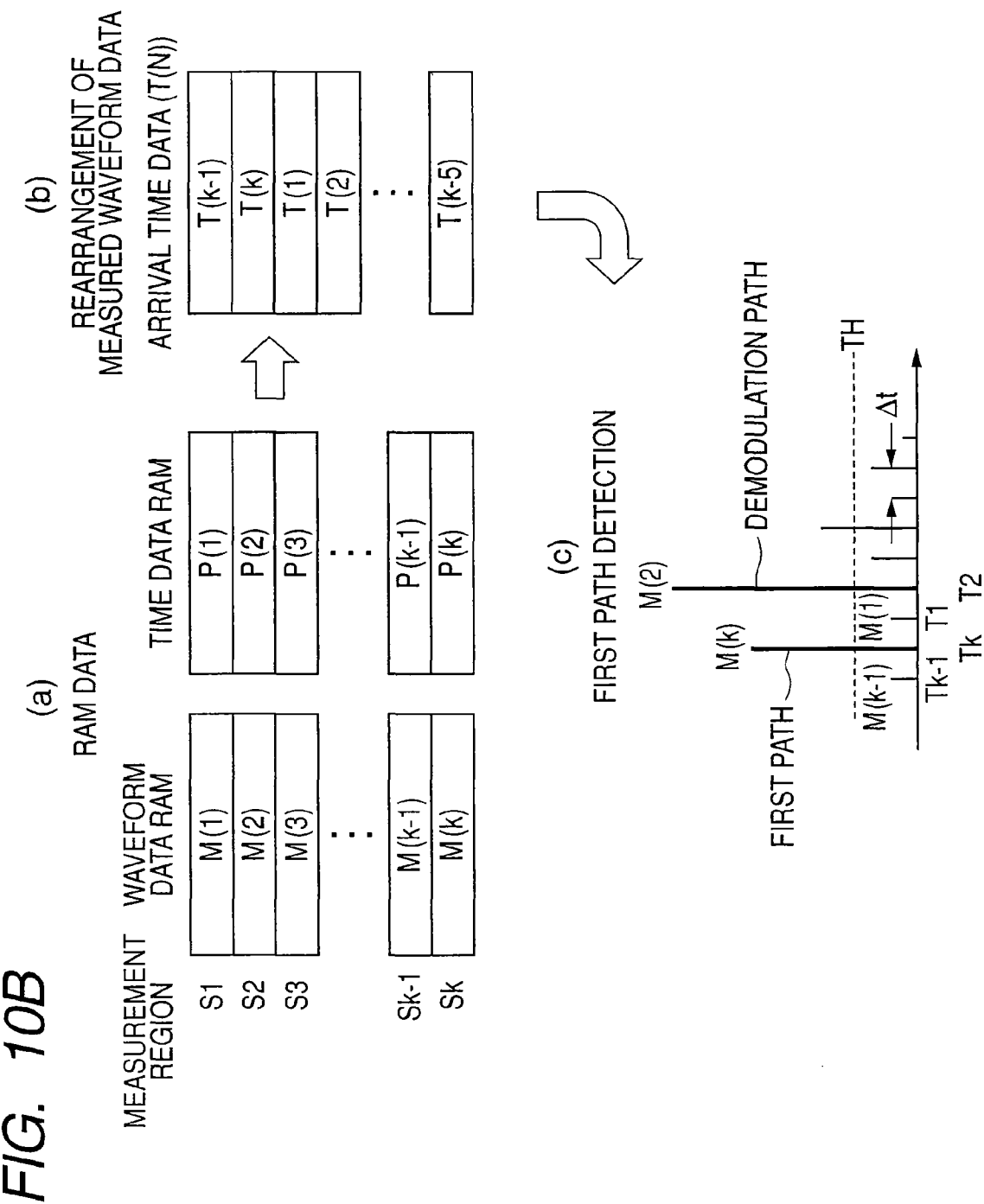

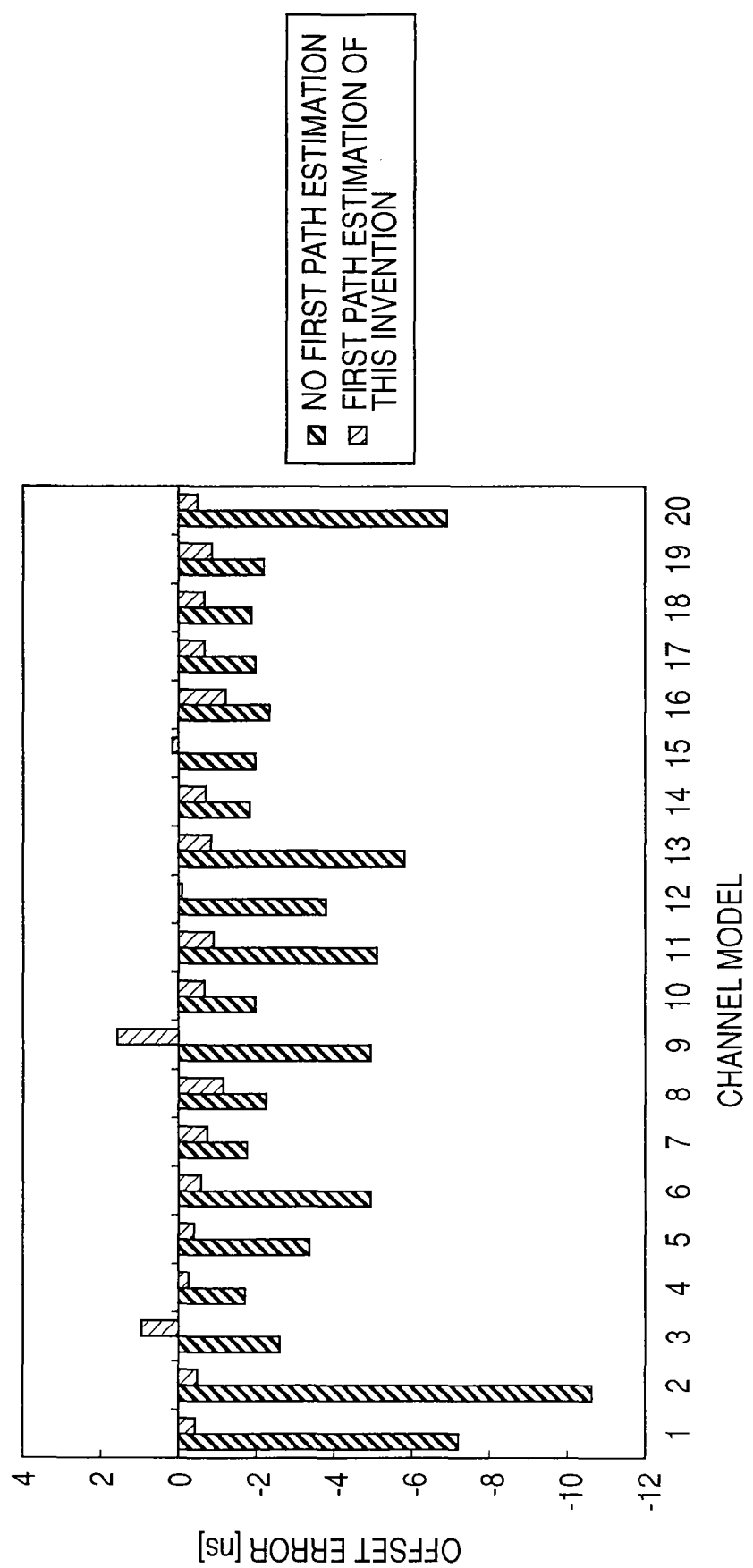

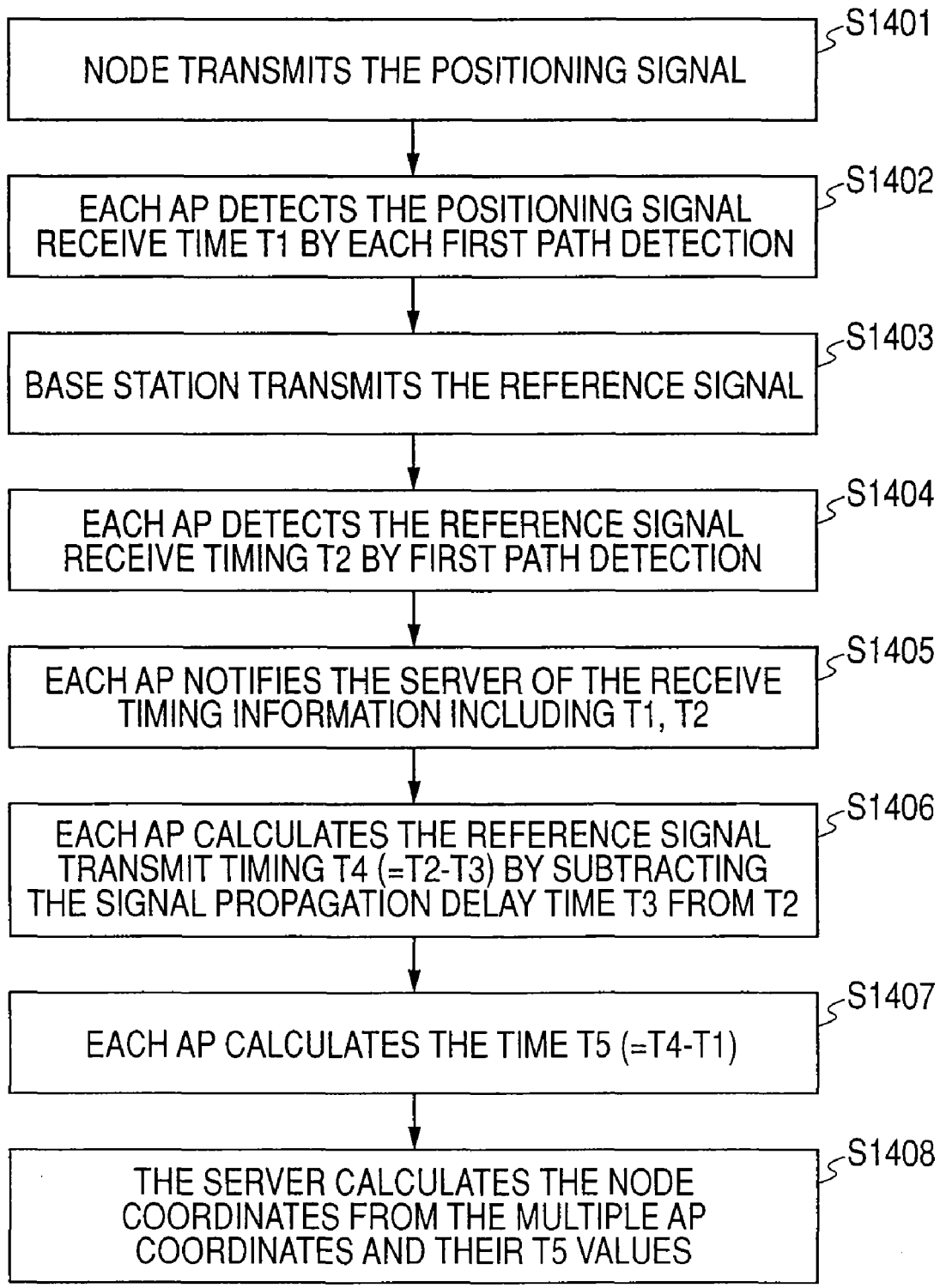

RECEIVER, RECEIVER FOR POSITIONING SYSTEM USING THE SAME, AND POSITIONING METHOD

CLAIM OF PRIORITY

The present invention claims priority from Japanese application JP 2006-262104 filed on Sep. 27, 2006, the content of which is hereby incorporated by reference into this application.

FIELD OF THE INVENTION

This invention relates to a receiver, positioning/ranging receiver and also to a positioning/ranging method for finding the position of a wireless device using that receiver, and/or the distance between wireless devices, by measuring the arrival time of radio waves.

BACKGROUND OF THE INVENTION

A technology proposed in the related art for measuring the position of a mobile terminal, calculates the differential in arrival times at multiple base stations of signals sent from a terminal, calculates the propagation distance of the signal from the node to each base station and then detected the node position. (Atsushi Ogino and 5 others, "Wireless LAN Integrated Access System (1) Evaluation of a position detection system", 2003 Lecture-Publication archives, Institute of Electronics, Information and Communication Engineers IEICE, B-5-2003, p. 662)

Another technology of the related art proposes constructing a positioning system that utilizes a reference station, in order to synchronize the base stations. (Kenichi Mizugaki and 9 others, "3 nW/bps Super Low Power Consumption UWB Wireless Systems (6): Evaluation of 30 cm High Accuracy Positioning System", 2005 Society Conference Lecture/Publication archives, Institute of Electronics, Information and Communication Engineers IEICE, A-5-15, p. 139.)

In a technology proposed in JP-A No. 14152/2002, a positioning system for making distance measurements by utilizing a spectrum spreading signal, creates a delay profile by subjecting the received RF wave to a matching filter process, and then makes use of this delay profile to measure the distance. Also, a technology proposed in JP-A No. 273778/2003, makes multiple delay profiles by performing matching filter processing on the delay profile of the received signal, and then utilizing those multiple delay profiles to measure the distance.

This invention is capable of improving positioning resolution by utilizing UWB-IR (Ultra wideband impulse radio) for wireless signals utilized in positioning systems and distance measuring systems.

FIG. 20 shows a typical waveform of a UWB-IR signal. The pulse width WTP is here defined as the amplitude in the period from 0 to 0. The measurement time accuracy can be improved, and a system with satisfactory positioning and distance measurement accuracy can be achieved by utilizing a narrow pulse width as shown in FIG. 20.

However, using this UWB-IR signal requires that the receiver capture a narrow width pulse and causing the problem of a larger hardware scale and higher power consumption. When receiving a pulse width WTP of approximately 2 ns for example, the sampling time period narrows as shown in FIG. 22, so that analog-to-digital (AD) converter is needed that operates at a speed of 500 MHz or higher, which is the multiplicative inverse of the WTP. Therefore, building a positioning or ranging system that utilizes UWB-IR signals by utilizing the technology in JP-A No. 14152/2002 or JP-A No. 273778/2003, causes the problems of high power consumption along with the increased hardware scale required to fabricate delay profiles.

The waveform received in multipath environments is not always for the direct path possessing the largest amplitude. FIG. 21 shows a typical receive waveform for a UWB-IR signal in a multipath environment. The vertical axis in the figure is the power component of the signal. Examining the FIG. 21 reveals that there are signals with higher power (amplitude) than the signal (first path) arriving earliest. The receiver in the above positioning systems and ranging systems must measure the first path output time. In normal data communication on the other hand, the signal received with the largest amplitude is the signal possessing the least communication errors yet signals with the most power have the problem of large positioning and distance measuring errors.

To resolve the above mentioned problems, the present invention provides a receiver, a receiver for a positioning and ranging system, and a positioning method for measuring the arrival time of a first path signal in the received signal with hardware having a simple structure and lower power consumption.

Typical aspects of this invention are described next. Namely, the receiver of this invention includes: a waveform measuring unit for performing multiple analog-to-digital conversions on the received signal while shifting the timing at each $\Delta t$ at a frequency identical to the nominal pulse repetition frequency of a transmit signal made up of intermittent pulses subjected to direct spreading, or an integer multiple of the same frequency, and at a frequency lower than the multiplicative inverse of the pulse width, and storing the observation data from the receive signal in a storage area, and a first path estimator unit to estimate the arrival time of the first path arriving earliest time-wise in the receive signal, based on the stored observation data from the receive signal.

This invention provides a low-cost, low-power consumption receiver for positioning and ranging, capable of measuring the output time of the first arrival signal in a receive signal by low-speed signal processing.

The receiver of this invention performs analog-to-digital (A/D) conversion on a frequency identical to the nominal pulse repetition frequency or an integer multiple of that frequency, and at a frequency less than the multiplicative inverse of the pulse width; offsets the analog-to-digital conversion timing at each $\Delta t$ and stores results from multiple receive signal measurements in a storage region, and estimates the earliest arrival time of the first path arriving time-wise in the receive signals, based on the stored waveform data from the receive signal.

The receiver then processes that data after analog-to-digital conversion by utilizing a matched filter whose tap coefficient matches the spreading code applied in the transmit signal, and sets the output with the highest S peak value among matched filter outputs within one cycle of measurement time as that output time.

The receiver next sets a specified threshold value from the stored waveform data and, waveform data with the earliest arrival time exceeding that threshold value is judged to be the first path signal.

The receiver next finds the time differential between the output time and the demodulated path time from the stored output time, and if there is a frequency deviation between the transmitter and receivers, finds the output time matching the respective waveform data from the time differential, and then estimates the frequency deviation between the transmitter and receiver, from the synchronizing tracking function for slaving the receiver clock to the receive signal, and then uses the frequency deviation results to correct the calculated output time.

BRIEF DESCRIPTION OF THE DRAWINGS

FIG. 9A is a graph showing the relation between the nominal pulse repetition frequency and the AD conversion speed in the first embodiment;

FIG. 9B is a graph showing the relation between the nominal pulse repetition frequency and the AD conversion speed in the first embodiment;

FIG. 10A is a concept drawing of the waveform measurement process in the first embodiment;

FIG. 10B is a concept drawing of the first path detection in the first embodiment;

FIG. 11 is a graph showing results from the first embodiment of this invention;

FIG. 14 is a sequence diagram showing an overview of the transmission and reception of signals in the second embodiment;

DETAILED DESCRIPTION OF THE PREFERRED EMBODIMENTS

The preferred aspects of this invention are described next in detail while referring to the following embodiments.

First Embodiment

The first embodiment of the receiver of this invention is described next while referring to FIG. 1 through FIG. 11.

The receiver of the first embodiment contains: a waveform monitor unit for performing waveform observation and synchronizing acquisition of pulse signals input from the antenna; a first path estimator unit for estimating the arrival time of the first path arriving earliest time-wise that is contained in the receive signal based on the stored receive signal observation data, and a measuring unit for measuring the position and distance utilizing the first path estimation results. This receiver also contains a demodulating-synchronization tracking unit for synchronization tracking and demodulating via the demodulated path.

Figure 1:
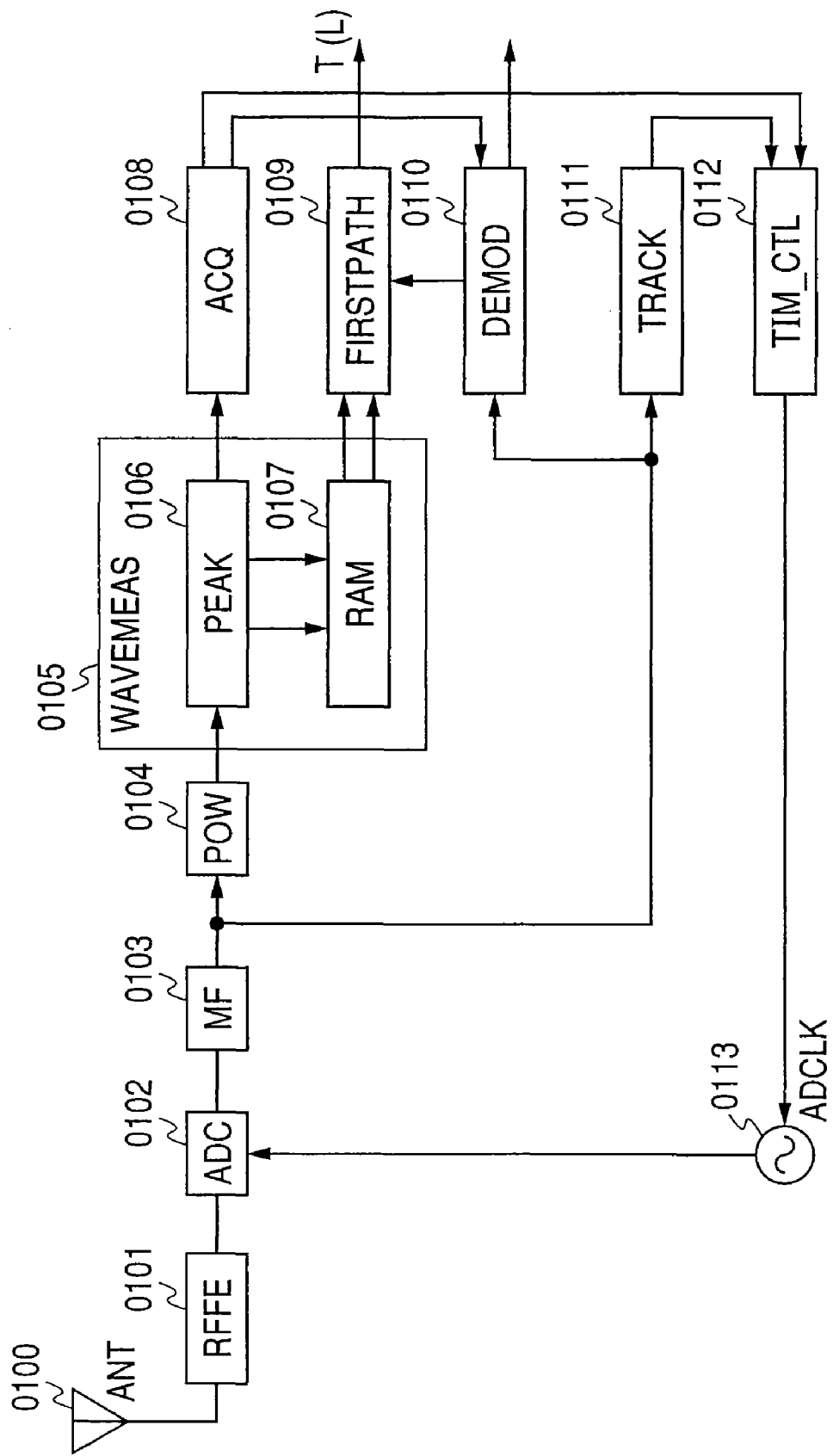
FIG. 1 is a drawing for describing the first embodiment of the receiver of this invention.

FIG. 1 is a block diagram showing the structure of the receiver of the first embodiment of this invention. The receiver of this embodiment includes an antenna (ANT) 0100, an RF front end unit (RFFE) 0101, an analog-to-digital converter unit (ADC) 0102, a matched filter unit (MF) 0103, a power unit (POW) 0104, a waveform measurement unit (WAVE MEAS) 0105, a synchronizing acquisition unit (ACQ) 0108, a first path estimator unit (FIRST PATH) 0109, a demodulator unit (DEMOD) 0110, a synchronizing tracker unit (TRACK) 0111, a timing control unit (TIM_CTL) 0112, and an AD clock generator unit (ADCLK) 0113.

The waveform measurement unit 0105 includes a peak detector unit (PEAK) 0106 and a storage unit (RAM) 0107.

The RF front end unit 0101 performs bandwidth limiting, noise eliminating, frequency conversion and amplification of the pulse signals input from the antenna 0100 if needed.

The analog-to-digital converter unit (ADC) 0102 AD converts the analog pulse signal output from the RF front end unit 0101 into a digital format.

The AD conversion speed at this time, is the same or an integer multiple of the nominal pulse repetition frequency, and moreover is a speed that is less than the multiplicative inverse of the pulse width WTP. In other words, the ADC clock generator unit ADCLK (0113) as shown in FIG. 9, outputs a clock (pulse) at the same frequency as the pulse repetition frequency (FIG. 9A) or an integer multiple of that frequency (FIG. 9B), and moreover having a frequency less than the multiplicative inverse of the pulse width WTP, and provides this clock pulse to the ADC (0112). The Ip of FIG. 9 indicates the pulse-to-pulse period.

The sampling timing in the analog-to-digital converter unit (ADC) 0102 is the timing at which clocks are outputted from the AD clock generator unit (ADCLK) 0113, namely an output timing that is sequentially offset by the TIM_CTL (0112) control signal. In other words, the control signal generated by the timing control unit (TIM_CTL) 0112 after receiving the output signal from the synchronizing acquisition unit (ACQ) 0108, regulates the timing of the AD clock generated by the AD clock generator unit (ADCLK) 0113, the above operation is repeated while sequentially offsetting the A/D conversion timing in the analog-to-digital converter unit (ADC) 0102 just by Δt, to search for the optimal AD conversion timing and matched filter output phase. The sequentially shifted timing Δt is a smaller value than the pulse width WTP.

The matched filter unit (MF) 0103 performs inverse spread processing on the ADC output signal that was analog-to-digital converted. In other words, the matched filter unit (MF) 0103 multiplies the tap coefficient (c) matching the spreading code (e.g., +1, −1, −1, +1) applied to the transmit signal, by the ADC output signal and outputs the MF.

The waveform measuring unit WAVEMEAS (0105) finds the output maximum value (M) of the MF (0103) and its output time (P), and stores that maximum value (M) and output time (P) in the storage unit RAM 0107.

The first path estimator unit (FIRST PATH) 0109 detects the first path from the time data string and the waveform data string detected in sequence from the RAM (0107), and then estimates the output time differential between the first path and the demodulated path.

The demodulator unit (DEMOD) 0110 besides performing data demodulation on the matched filter output phase found by the synchronizing acquisition unit (ACQ) 0108, also generates a perceive synch. Signal and, outputs it to the first path estimator unit (FIRST PATH) 0109.

The synchronizing tracker unit (TRACK) 0111 contains a function to retaining the AD conversion timing found in by the first path estimator unit (FIRST PATH) 0109.

Figure 2:
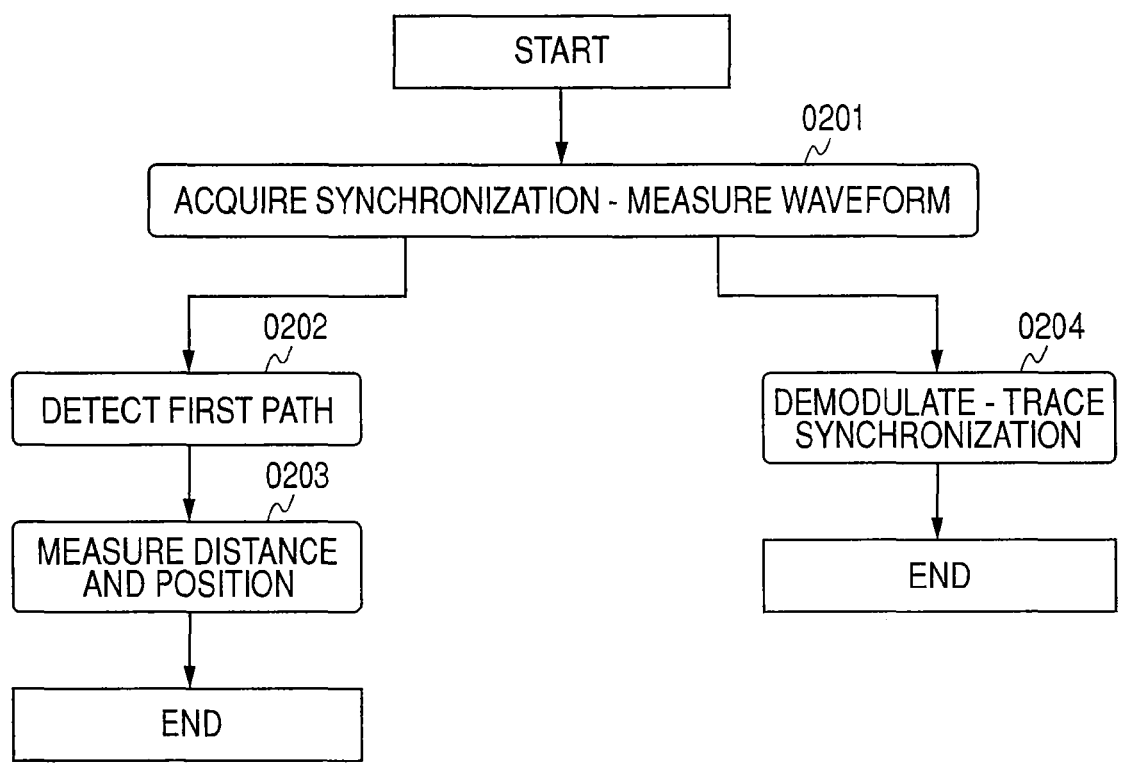
FIG. 2 is a flow chart showing the overall operation of the receiver in FIG. 1.

FIG. 2 is a flow chart for showing the overall operation of the receiver of FIG. 1.

The receiver performs synch acquisition and waveform observation (S201) on the pulse signal input from the antenna ANT 0100. The receiver then performs first path detection (S202) and distance-position measurement (S203). The receiver performs demodulation and synch tracking (slaving) (S204). The structure of the distance-position measurement function is described in later embodiments and is therefore omitted from FIG. 1.

A specific description of first path detection and waveform observation by the receiver shown in FIG. 1, is described next while referring to FIG. 3 through FIG. 7.

Figure 3:
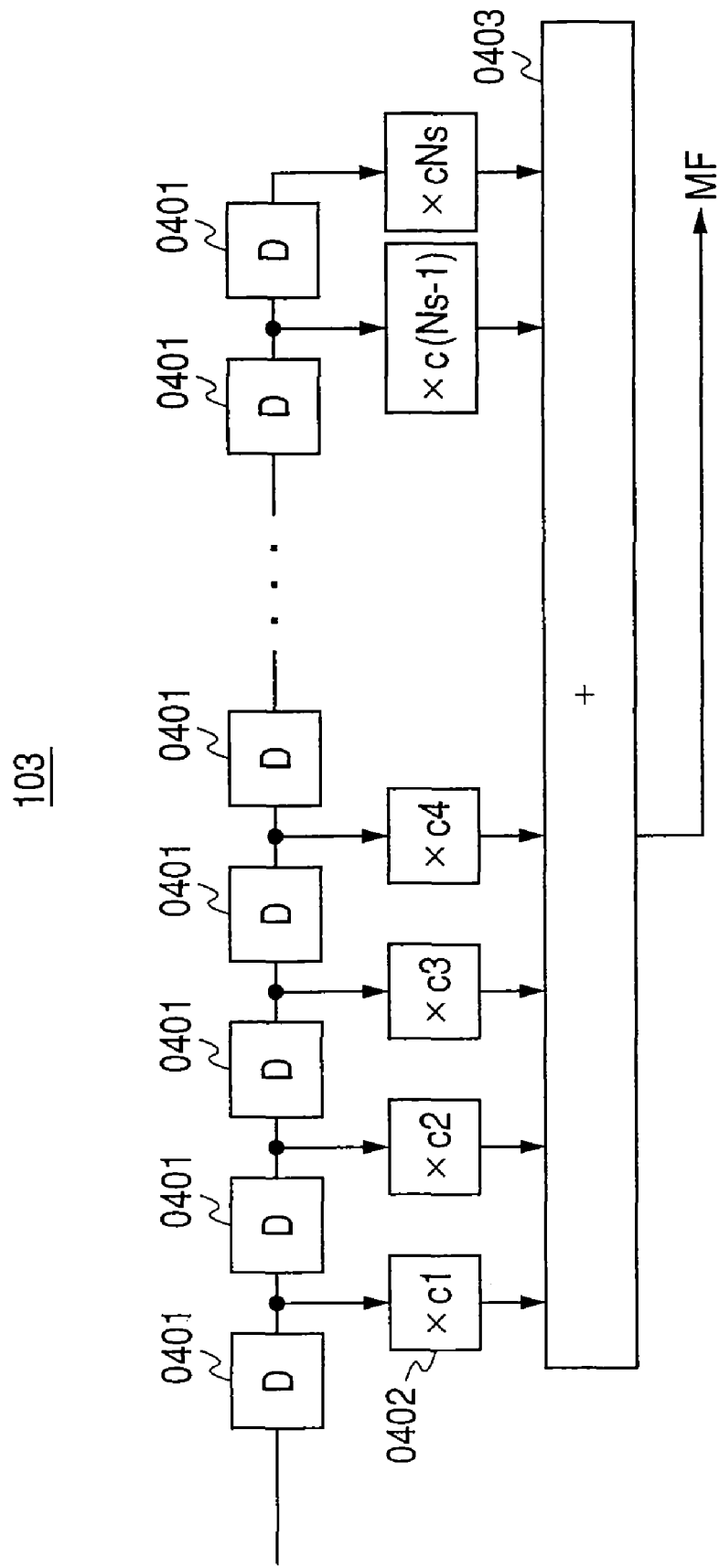
FIG. 3 is a concept view showing the matched filter structure in the first embodiment.

First of all, the structure of the matched filter unit MF (0103) is shown in FIG. 3. The matched filter unit MF (0103) includes Ns number of delay lines (D) with taps 0401, and Ns number of coefficient multipliers (xc1-cNs) 0402, and an adder (+) 0403. This matched filter unit MF (0103) performs the matched filter processing in which filter tap coefficients match the spreading code applied to the transmit signal. The delay length of the delay line is ideally the same as the pulse interval. The Ns is the length of the spreading code applied to the transmit signal. The receiver uses the matched filter in this way to improve the SN (signal-to-noise) ratio.

In matched filter processing, data possessing a maximum amplitude is output when the coefficient string from the coefficient multiplier precisely matches the phase of the spreading code, and the SN ratio can then be improved. Theoretically, setting the SN ratio after AD conversion of the each pulse to SN_pulse, yields (Ns×SN_pulse) as the SN ratio SN_MF of data possessing the maximum amplitude after matched filter processing.

Figure 4A:
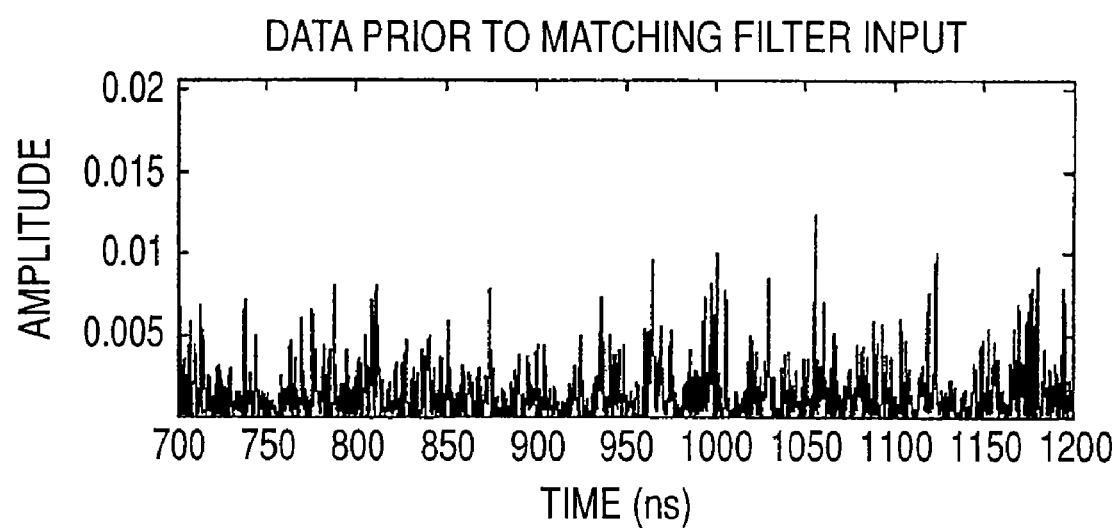
FIG. 4A is a waveform figure showing matched filtering results in the first embodiment.
Figure 4B:
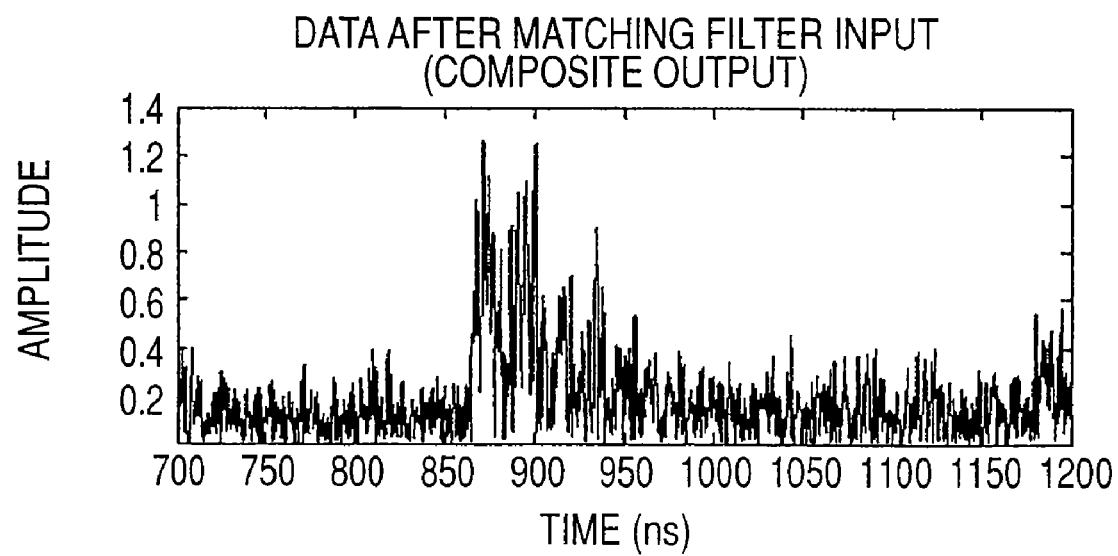
FIG. 4B is a waveform figure showing matched filtering results in the first embodiment.

Effects from that processing are shown in FIG. 4. The power component of the receive pulse waveform is shown in FIG. 4A, the differential between the signal and noise levels is not larger. FIG. 4B however, shows the power component after the matched filter processing. Examining this figure shows that there is a larger differential between the signal and noise levels in the composite data after processing.

Figure 5:
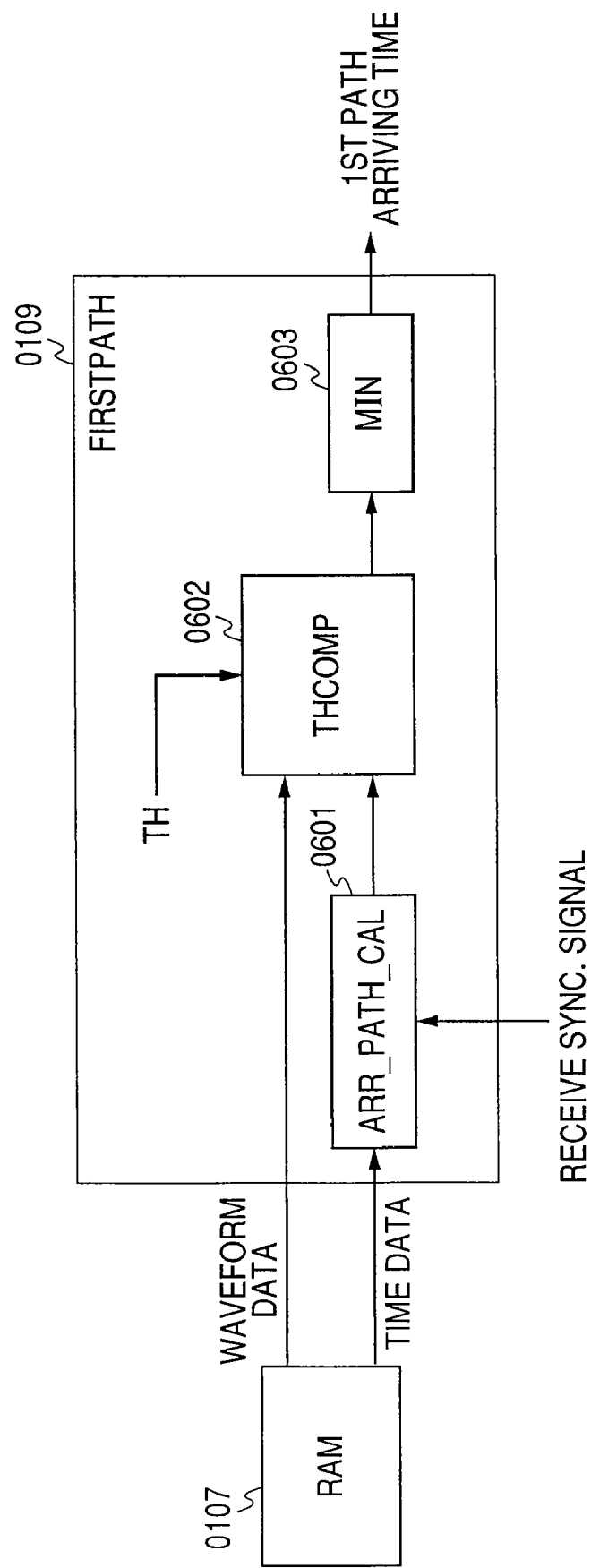
FIG. 5 is a block diagram showing the structure of the first path estimator unit in the first embodiment.

FIG. 5 shows a structure of the first path estimator unit (FIRSTPATH) 0109 in the receiver of the first embodiment. The first path estimator unit of FIG. 5 includes an output time estimator unit (ARR_PATH_CAL) 0601, a threshold calculator unit (THCOMP) 0602, and a minimum value detector unit (MIN) 0603.

This first path estimator unit (FIRSTPATH) 0109 detects the first path from the MF (0103) output waveform data string's maximum value (M) and its output time (P) that were output in sequence from the RAM (0107), and then estimates the output differential in output times between the demodulated path and the first path.

First of all, the first path estimator unit (FIRST PATH) 0109 estimates the output time differential T (L) between the demodulated path and the first path, from the time data string P(1−K) and the waveform data string M(1−K) that are outputted in sequence from the RAM (0107).

The RAM 0107 sequentially outputs the time data string P(1−K) and the waveform data string M(1−K) to the first path estimator unit. The ARR_PATH_CAL (0601) calculates the respective output times for M(1−K) and P (1−K) by using the Receive synch. Signal. In other words, it calculates the differential in output time between the demodulated path and arrival time data of T(N) by using P(1−K) and stores these calculation results in the memory. The threshold comparator unit THCOMP (0602) compares M(1−K) with the specified threshold TH, and when M(N)>TH, outputs the arrival time data T(N). The minimum value detector MIN 0603 outputs the minimum value (first path arrival time) of this arrival time data T(N). The minimum value T(N) for the arrival time data is estimated as the first path, and the output time differential T(L) between this first path and the demodulated path is obtained.

Figure 6:
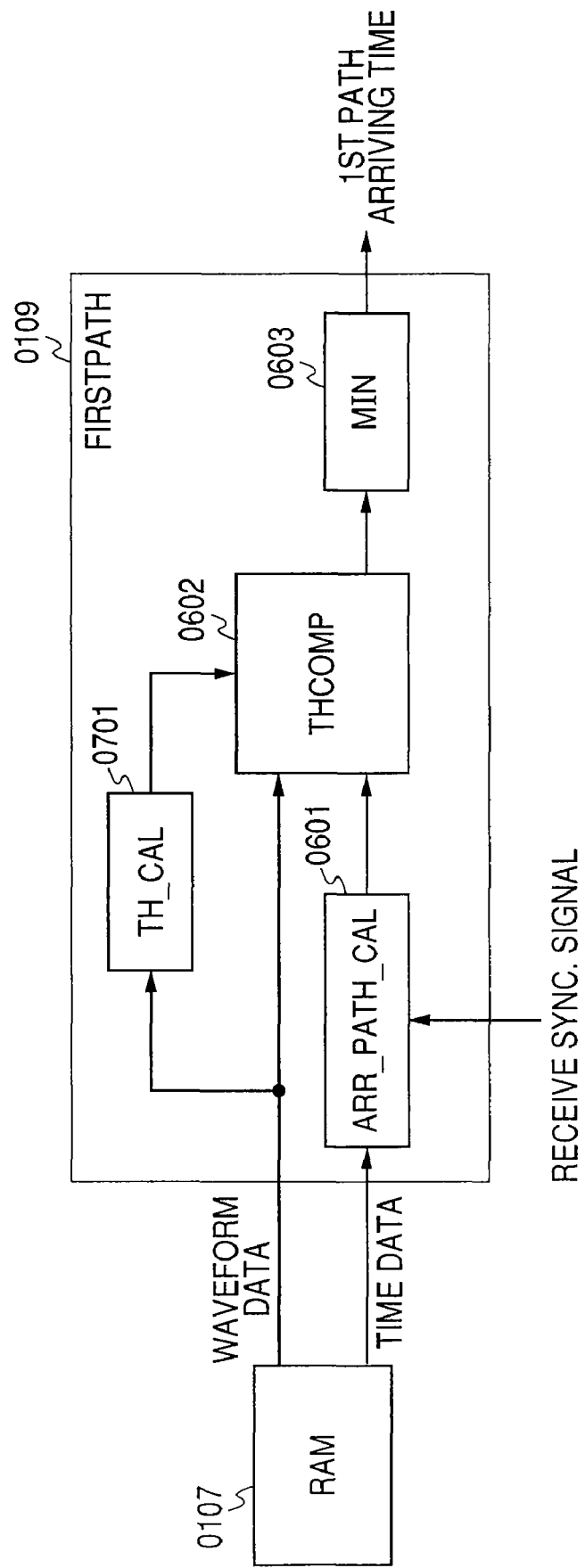
FIG. 6 is a block diagram showing another structure of the first path estimator unit in the first embodiment.

FIG. 6 is a block diagram showing an example of another structure of the first path estimator unit (FIRSTPATH) 0109 for the receiver of the first embodiment. In addition to the structure of FIG. 5, the first path estimator unit (FIRSTPATH) 0109 contains a threshold calculator unit (TH_CAL) 0701. The TH_CAL 0701 contains a function for finding the threshold TH in the embodiment in FIG. 5, from the waveform data string P(1−K) stored in the RAM 0107.

In one example of the TH_CAL 0701 operation, the TH_CAL 0701 contains a function for processing such that TH=(maximum value for M(1−K)/A).

However, A is here an appropriate constant.

In another example of the TH_CAL 0701 operation, the TH_CAL 0701 contains a function for processing such that TH=(average value for M(1−K))×A.

However, A is here an appropriate constant.

In yet another example of the TH_CAL 0701 operation, the TH_CAL 0701 contains a function for processing such that TH=(average value for M(1−K))×A, when the data string M'(1−K) is extracted as the maximum value for M(1−K) from the data string M(1−K).

However, A is here an appropriate constant.

The TH_CAL 0701 therefore possesses many operations, and there are no restrictions on the actual method.

Figure 7:
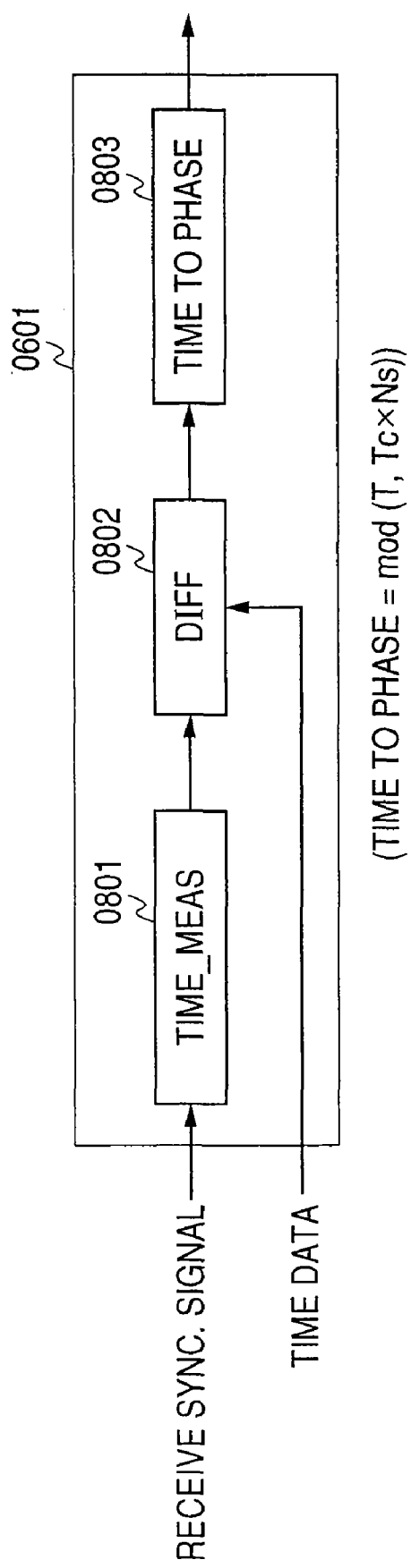
FIG. 7 is a block diagram showing the structure of the first path estimator unit/output time calculator unit in the first embodiment.

FIG. 7 shows an example of the structure of the output time calculator unit (ARR_PATH_CAL) 0601 within the first path estimator unit (FIRSTPATH) 0109 in the receiver of the first embodiment.

The output time calculator unit (ARR_PATH_CAL) 0601 includes a time measurement unit (TIM_MEAS) 0801, an output time differential calculator unit (DIFF) 0802, and a time phase converter unit (TIME TO PHASE) 0803. As described above, the output time calculator unit uses P(1−K) to calculate the differential in output times between the demodulated path and the respective output times for M(1−K) and P (1−K) by using the receive synch signal.

The TIM_MEAS 0801 measures the time that the receive synch signal is inputted. The DIFF 0802 utilizes the above measurement results and the time data string P(1−K), to calculate the time differential T(1−K) between the times that the receive sync signal, and the respective data M(1−K) arrived. The time phase converter unit (TIME TO PHASE) 0803 converts the time differential into a phase T(N) for the spread pulse string. In this phase conversion operation, when the pulse interval is set as Tc, and the spreading code length is set as Ns, then, Mod (T(1−K), Tc×Ns) is applied to the calculation. Here, mod (a,b) is the remainder where a is divided by b.

Utilizing the above structure attains a low-power consumption, positioning receiver with a simple structure, and capable of estimating the output time of the first path signal with high accuracy by a low-speed AD converter device, without utilizing an AD converting device or in other words, a high-speed converter having high-resolution within the pulse width WTP.

Figure 8:
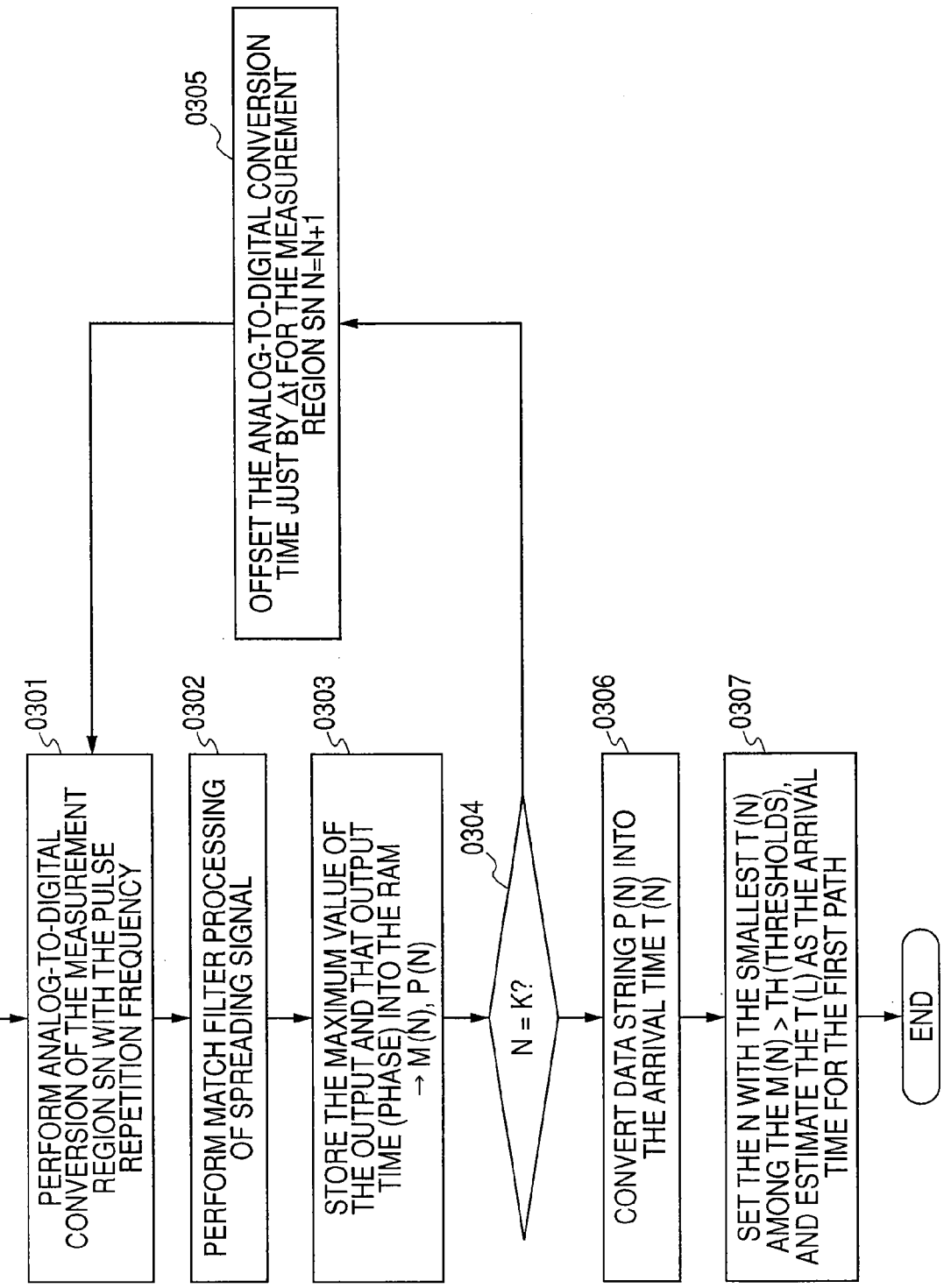
FIG. 8 is a flow chart for describing the procedure for detecting the first path in the first embodiment.

The operation of the first path detection function within the receiver in FIG. 1, is described while referring to the flow chart in FIG. 8, a drawing showing the relation of the AD converter timing and the UWB-IR signal shown in FIG. 9, and the operating principle in FIG. 10.

The receiver of this embodiment, receives UWB-IR signals, such as transmit signals where a direct sequence was applied to each pulse, and the baseband pulses are modulated by BPSK (binary phase shift keying) as shown in FIG. 9A. The amplitude in the period from 0 to 0 is here defined as the pulse width WTP. Increasing the number of sampling points as shown in FIG. 9B tends to improve accuracy and speed up the synch acquisition time. However increasing the sampling points also increases the hardware power consumption so that the sampling period should be set according to the application, within the range of the condition of: a frequency identical to the nominal pulse repetition frequency or an integer multiple of that frequency, and at a frequency less than the multiplicative inverse of the pulse width.

Processing for waveform observation in Step 0301 through Step 0305, and first path detection in Step 0306 through Step 0307 are executed according to the flow chart in FIG. 8.

In the measurement zone Ws (See (b) in FIG. 10A) on the receive waveform, the receiver performs AD conversion (sampling) (in Step 0301 of FIG. 8) while offsetting the phase relation of the receive waveform and the AD conversion points by Δt.

The waveforms shown in (a) through (c) of FIG. 10A possess a common time axis T along the horizontal axis. The observation waveform in (b) is an overall figure plotted with M on the vertical axis, and showing the estimated waveform results for time resolution Δt. In (c) of FIG. 10A, the t01, t02, t03, . . . , t0k indicate the timing for AD conversion (sampling) relating to measurement zone S1. There are k (for example, 31) sampling points.

In measurement zone S1, the analog-to-digital converter unit (ADC) 0102, performs analog-to-digital A/D conversion on the received pulse strings at the pulse repetition frequency or its integer multiple, and at a speed that is the multiplicative inverse of the pulse width WTP. The analog-to-digital converter unit (ADC) 0102 then generates an ADC output signal as shown in (e) in FIG. 10A.

The matched filter unit (MF) 0103 applies a matched filter (MF) having tap coefficients (c) that match the spreading code to the ADC output signal that was AD converted (step 0302). The matched filter unit (MF) 0103 then generates an MF output signal for the measurement zone S1 as shown in (f) in FIG. 10A.

The waveform measurement unit (WAVE MEAS) 0105 finds the maximum value (M) of the output from MF (0103) and its output time (P). The data M, P for the output time (P) and the maximum value (m) of the waveform (M) relating to this measurement zone S1, are stored in the RAM 0107 (step 0303) as shown in (a) of FIG. 10B.

The above procedure is also repeated for the measurement zones S2 through Sn (t01+Tk+Δt, t02+Tk+Δt, . . . , t0k+Tk+, Δt, t01+2Tk+, 2Δt, t02+2Tk+2Δt, . . . , t0k+2Tk+2Δt, . . . ) while shifting the AD conversion timing by the time resolution Δt. The Tk=k (number of sampling points)×Ip is also set. The data M (N), P (N) for the output time (P) and the maximum value (M) of the waveform output at each timing is then stored in the RAM 0107. This operation to shift the Δt timing as shown in (d) of FIG. 10A signifies that the position relation of each AD conversion point and receive waveform in the measurement zones S2 through Sn are shifted sequentially at each Δt, 2Δt, 3Δt, . . . .

In other words, the synchronizing acquisition unit (ACQ) 0108 accepts the maximum value (M), and using the TIM_CTL 0112, ADCLK 0113, sequentially shifts the AD conversion timing in the ADC 0102 just by Δt, and repeats the operation to search for the optimal AD conversion timing and matched filter output phase.

In the example in FIG. 8, M(N), P(N) are set as the maximum values for the N-th measurement.

This maximum value (M) is stored as waveform data, and the output time (P) as time data in the RAM 0107 (See (a) in FIG. 10B) while shifting each measurement zone or in other words, shifting the AD conversion timing to each Δt. The power component for this MF output signal is the same as described in (b) of FIG. 4.

This process is repeated a specified number of times (K times) in Step 0304, Step 0305.

The first path estimator (FIRST PATH) 0109 then performs first path detection or in other words, estimates the first path using the data strings M and P stored in the RAM (0107).

First of all, a converted data string T(n) is made from the AD converted data string P(n) at the time that the respective data M (N) arrived (step 0306). Namely, the time data string P(N) (=AD conversion timing t01, t02, t03, . . . , t0k, t01+Δt, t02+Δt, . . . , t0k+Δt, . . . , etc.) is rearranged into a time data string T(N)=arrival time sequence (for example, tk−1, tk, t1, t2, . . . , tk−5) at each time resolution Δt (See (b) in FIG. 10B). The time resolution Δt is the same size in FIG. 10A and FIG. 10B.

The first path estimator (FIRST PATH) 0109 further calculates and outputs the first path output time (tk) from the observation waveform M (N) and the time data string T (N) (step 0307). In other words, when T(N) is set as L for the minimum N, as an N satisfying M(N)>TH for the specified threshold TH, in the measurement zones Ws (=S1−Sn), then the FIRST PATH 0109 sets T(L) as the output time for the first path signal (See (c) in FIG. 10B).

In (c) of FIG. 10B, the first path signal (time Tk, observation waveform data M (k)) satisfies M(N)>TH, and T(N) satisfies the minimum condition. Also, the demodulated path signal (time t2, observation waveform data M(2)) is the observation waveform with maximum waveform data values.

In the description up until now, only the maximum value and its output time within the same AD conversion timing (within the same measurement zone S) per peak detector unit (PEAK) 0106 were stored in the RAM 0107 for a single measurement. However another method with even higher accuracy is possible that stores a second maximum value and its output time within the same AD conversion timing in the RAM 0107, and generates an arrival time data string T (N) for the observation waveform by using both these data relating to the first, and second maximum values, and uses these to estimate the first path in the same way.

The data stored in the RAM 0107 can be further increased. Storing a larger quantity of data allows utilizing signals hidden in large input signals in the calculation, and also reduces errors when estimating the first path.

FIG. 11 shows effects from applying this embodiment verified by simulation. The multipath model is a model simulating a line of sight in an office. The horizontal axis is an index of multipath models that were applied, the vertical axis is the measurement error for the packet receive time, and show the case when there was no first path estimation and, when first path estimation was performed. Applying the present invention therefore allows estimating the first path with greater accuracy and with fewer errors.

Therefore when the wireless signal utilizes UWB-IR technology, the present embodiment can measure the output time of the first arrival signal in the receive signal even with low-speed signal processing. There is therefore no need to use AD converters with a high resolution within the pulse width WTP, or in other words no need to use high-speed converters, the first path signal output time can be estimated with high accuracy by a low-speed AD converter, and renders a positioning and distance-measurement receiver with a simple structure and low-power consumption.

Moreover, during normal data communication, the receiver can receive and demodulate the maximum value (M) of observation waveform data equivalent to the signal with the largest amplitude, so there are few communication errors.

Second Embodiment

Figure 12:
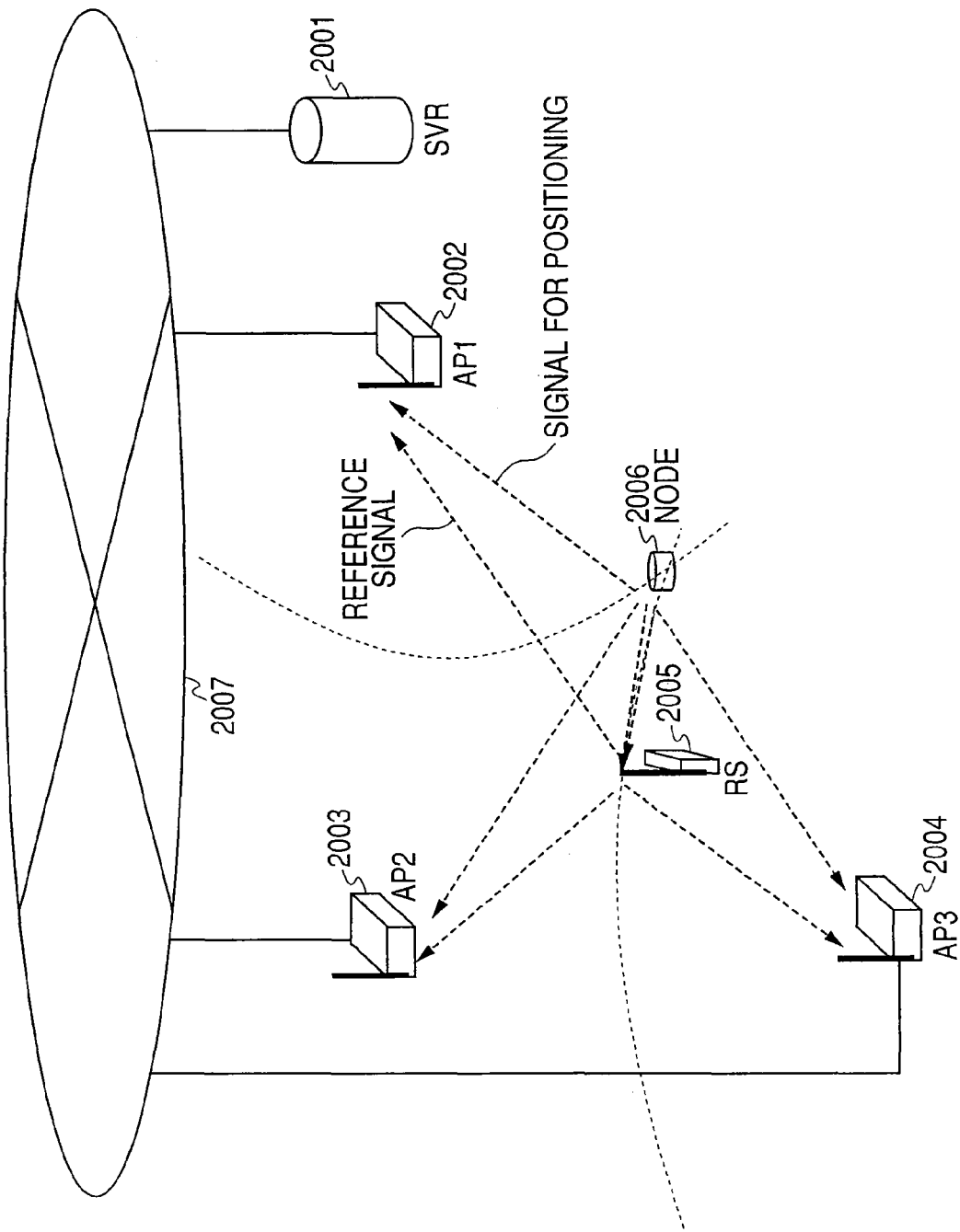
FIG. 12 is a drawing showing an example of the terminal positioning system in the second embodiment of this invention.

A system utilizing the receiver device of the first embodiment as a terminal positioning system forming the second embodiment is described in FIG. 12 and FIG. 13.

FIG. 12 shows a concept diagram of the terminal positioning system. The terminal positioning system includes a positioning server (SVR) 2001, base stations (AP 1-3) 2002, 2003, 2004, a reference station (RS) 2005, a terminal (NODE) 2006. The base stations AP1 (2002), AP2 (2003), AP3 (2004) and the SVR (2001) are connected via a network 2007.

The NODE (2006) contains a wireless communication function. The reference station RS 2005 contains a wireless receive and a wireless transmit function. The AP1 2002, AP2 2003, and AP3 2004 contains a wireless receive function and a time measurement function.

The AP1 2002, AP2 2003, AP3 2004 receive the signal transmitted from the RS 2005 and perform mutual time synchronization. The AP1 2002, AP2 2003, AP3 2004 receive the wireless signal transmitted from the NODE 2006, and measure the respective arrival time differentials. The SVR 2001 calculates the NODE 2006 coordinates from the measured arrival time differentials.

In this terminal positioning system, the AP1 2002, AP2 2003, AP3 2004, and RS 2005 coordinates must be known in advance, in order to calculate the AP1 2002, AP2 2003, AP3 2004 synchronizing and terminal positions.

Figure 13A:
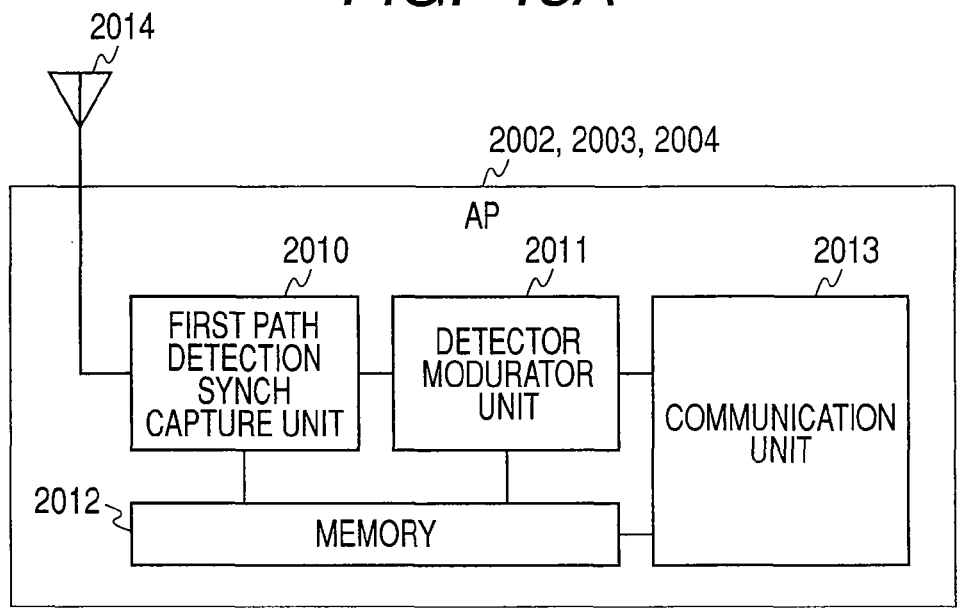
FIG. 13A is a block diagram showing the structure of the base station in the second embodiment of this invention.

FIG. 13A is a block diagram showing an example of the structure of the base stations (AP1-3) 2002, 2003, and 2004. The reference station includes a first path detector-synch acquisition unit 2010, detector-demodulator unit 2011, memory 2012, communication unit 2013, and antenna (ANT) 2014. The first path detector-synch acquisition unit 2010 contains a source clock generator SCG for synchronizing with the required clock signals. The first path detector-synch acquisition unit 2010 also contains a synch acquisition function for generating shift signals to change the phase of clock signals generated in the SCG, and perform synch acquisition between the clock signal and the transmit signal whose clock phase was changed; and a first path estimator function described in the first embodiment, and a time differential measurement function for measuring the time differential between the received positioning signal and reference signal using the shift signal and the clock signal.

Figure 13B:
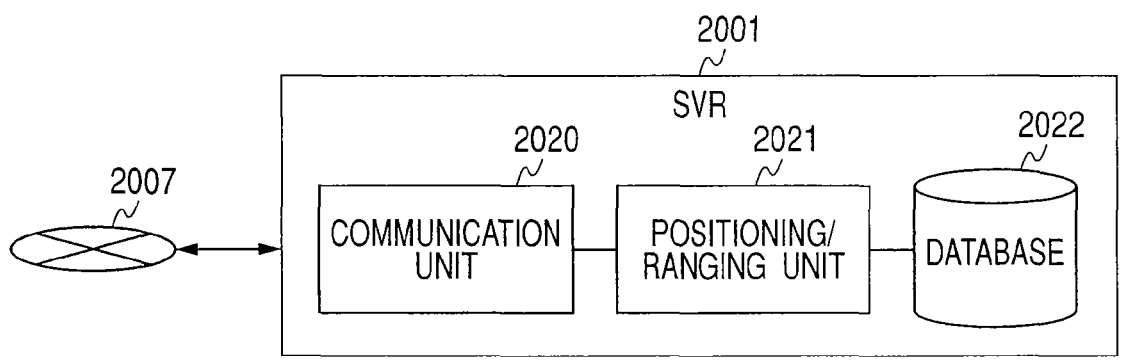
FIG. 13B is a block diagram showing the structure of the positioning server of the second embodiment of this invention.

FIG. 13B is a block diagram showing an example of the structure of the positioning server (SVR) 2001. The positioning server includes a communication unit 2020, a positioning/ranging unit 2021 (and functions) and a database 2022. The communications unit 2020 functions as an interface to connect the positioning server to the network 2007, accept the positioning information notification sent from the base stations, and send it to the positioning/ranging unit 2021. The positioning/ranging unit 2021 calculates the node 2006 position based on information such as the reference system position and each base station position obtained from the database 2022 and information on the signal receive time differential for each base station contained in the positioning information notification.

FIG. 14 is a sequence diagram showing an overview of the transmitting and receiving of signals in the positioning/ranging system of the second embodiment.

The node 2006 sends a transmit signal containing a positioning signal (S1401) to the peripheral base stations (AP1-3) 2002, 2003, and 2004 and reference station (RS) 2005, at an optional desired time for calculating the position, such as at particular periods or when a sensor installed in the node detects an error. When the base stations (AP1-3) 2002, 2003, and 2004 receive this transmitted signal, they perform synch acquisition to synchronize the sampling clock with the transmit signal, i.e. a positioning signal. Demodulating and sync tracking are performed after synch acquisition is complete. When this transmit signal is received, the base stations (AP1-3) 2002, 2003, and 2004 detect the positioning signal receive time T1 (S1402) based on the first path detection function as described in the first embodiment. After receiving a transmit signal containing the positioning signal, the reference station (RS) 2005 sends a transmit signal containing the reference signal (S1403). After receiving a transmit signal containing the reference signal, the base stations (AP1-3) 2002, 2003, and 2004 detect the reference signal receive time T2 (S1404) based on the first path detection function as described in the first embodiment. The base stations (AP1-3) 2002, 2003, and 2004 then send the positioning information, the receive time information T1, T2 and the ID for identifying the base station and other information via the network to the positioning server (SVR) 2001 (S1405). Each base station also measures the receive time differentials between the reference signal and positioning signal while at the same time, performing receive processing of transmitted signals such as for synch acquisition, demodulation, and synch tracking, and based on those results sends information to the positioning server (SVR) 2001. The "time" detected in the first path detection function of this embodiment, is equivalent to the "time" when the multiple measurement zone phases are arrayed in the first embodiment.

The base stations (AP1-3) 2002, 2003, and 2004 calculate the reference signal transmit time T4 (S1406) by subtracting the signal propagation delay time T3 from the reference signal receive time T2 (S1406). The base stations (AP1-3) 2002, 2003, and 2004 further calculate the time T5 (S1407) by subtracting the receive time T1 from the reference signal transmit time T4.

The positioning server (SVR) 2001 then performs positioning and distance measurement (S1408) by calculating the node 2006 coordinates from information relating to time T5 for base stations (AP1-3) 2002, 2003, and 2004, and information recorded in the database held by the server.

The present embodiment is capable of measuring the output time of the first arrival signal within the receive signal by low-speed signal processing, and renders a positioning and ranging receiver with a simple structure and low-power consumption.

Third Embodiment

A third embodiment of the receiver of this invention is described next while referring to FIG. 15.

Figure 15:
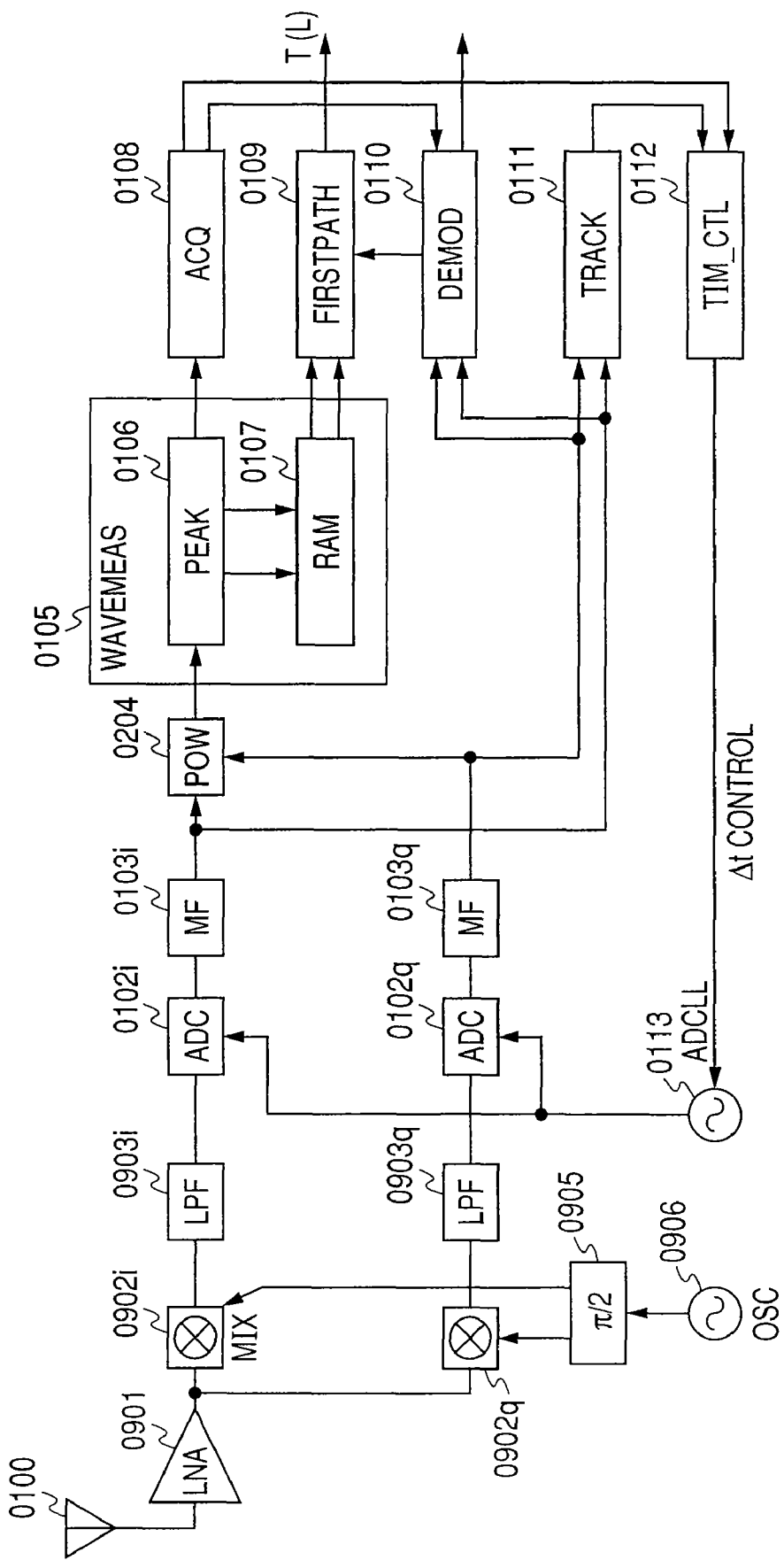
FIG. 15 is a block diagram for describing the third embodiment of the receiver of this invention.

FIG. 15 is a block diagram showing the structure of the receiver of the third embodiment of this invention.

The receiver in this embodiment includes: an antenna (ANT) 0100, a low-noise amplifier (LNA) 0901, a mixer (MIX) 0902, a low-pass filter (LPF) 0903, an analog-to-digital converter (ADC) 0102, a matched filter unit (MF) 0103, a power unit (POW) 0204, a wave measurement unit (WAVE MEAS) 0105, a synchronization acquisition unit (ACQ) 0108, a first path estimator unit (FIRST PATH) 0109, a demodulator unit (DEMOD) 0110, a synch tracking unit (TRACK) 0111, a timing control unit (TIM_CTL) 0112, and AD clock generator unit (ADCLK) 0113, an oscillator unit (OSC) 0906, and a 90 degree phase shifter ($\pi/2$) 0905. The WAVE MEAS unit 0105 includes a peak detector unit (PEAK) 0106 and a storage unit (RAM) 0107.

The ANT 0100, ADC 0102, MF 0103, WAVE MEAS 0105, ACQ 0108, FIRST PATH 0109, DEMOD 0110, TRACK 0111, TIM_CTL 0112, ADCLK 0113, PEAK 0106, and RAM 0107 in FIG. 15 all possess the same functions as the block with the same signals in FIG. 1.

Figure 20A:
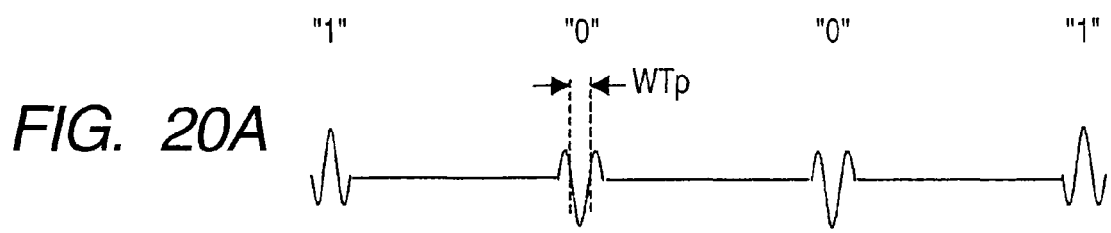
FIG. 20A is a drawing showing an example of a UWB-IR waveform.
Figure 20B:
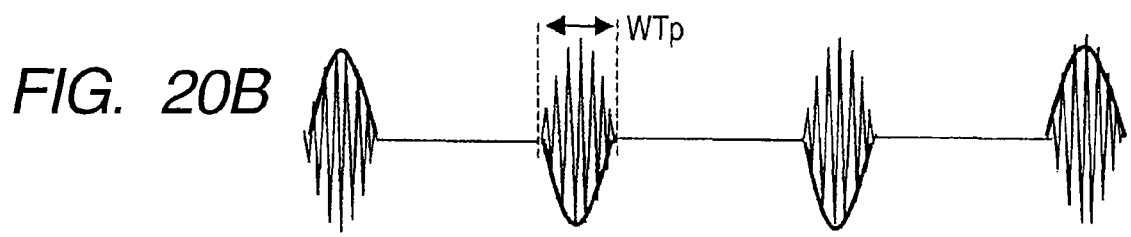
FIG. 20B is a drawing showing an example of a UWB-IR waveform.
Figure 21:
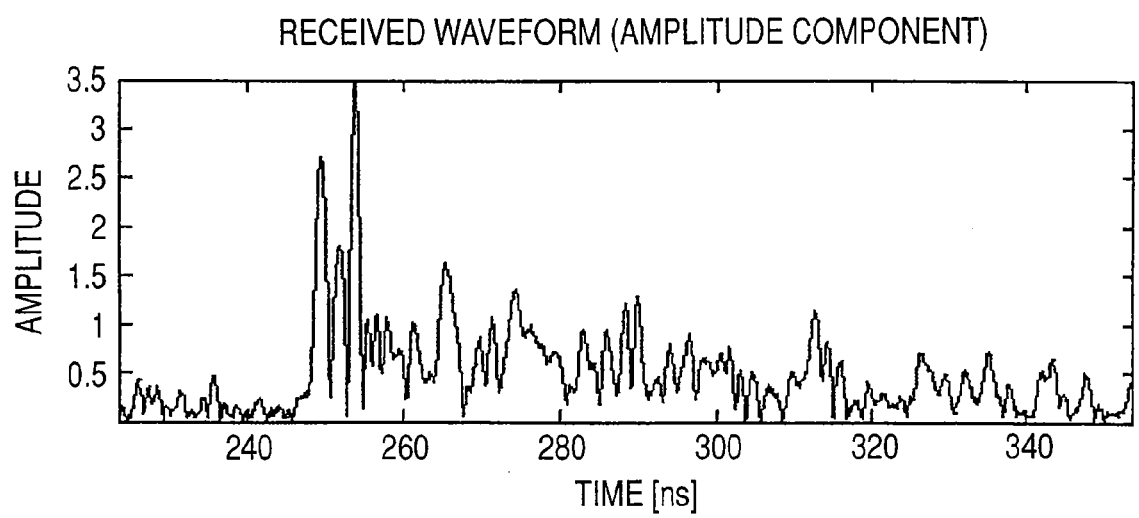
FIG. 21 is a drawing showing the receive waveform (amplitude component) in a multipath environment.
Figure 22:
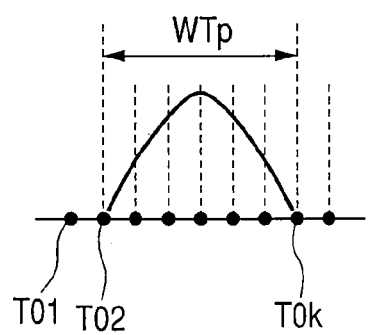
FIG. 22 is a drawing showing an example of the sampling timing in the related art.

The receiver in FIG. 15 receives transmit signals that are a carrier wave modulated by BPSK (Binary phase shift keying) in the modulated pulse waveform as shown for example in FIG. 20B, and a direct (spread) sequence is applied to each pulse.

The LNA 0901, MIX 0902, LPF 0903, ($\pi/2$) 0905, OSC 0906 make up sections equivalent to the RFEE (0101) in FIG. 1.

The LNA 0901 amplifies the signal input from the ANT 0100, and the carrier wave then removed and the baseband pulse waveform restored in the MIX 0902, LPF 0903, ($\pi/2$) 0905, OSC 0906. In this case, two orthogonal components whose phase is shifted 90 degrees are generated. The POW 0204 finds the power by calculating the squared sum from the two MF 0103*i* and the MF 0103*q*.

Other sections of the structure and operation are identical to the first embodiment as shown in FIG. 1 through FIG. 11.

The present invention can estimate the output time of the first path with high accuracy and low power consumption in a simple structure, even if the transmit signal is a modulated pulse waveform utilizing a carrier wave.

Utilizing the receiver of this embodiment, allows measuring the output time of the first path arrival signal in the receive signal at low-speed signal processing, and renders a positioning and ranging receiver with a low-cost and low-power consumption.

Fourth Embodiment

The fourth embodiment of the receiver of this invention is described next while referring to FIG. 16 and FIG. 17.

Figure 16:
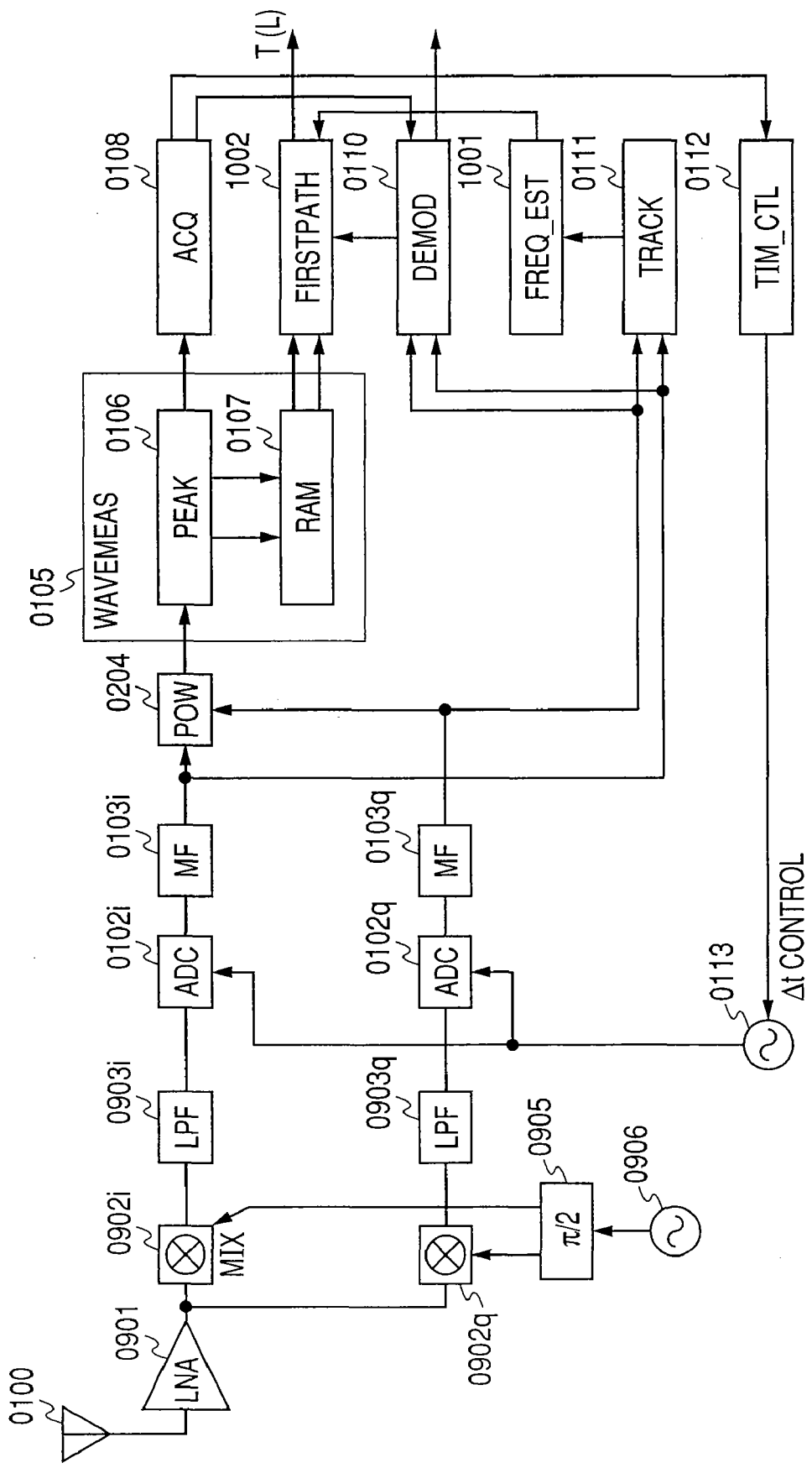
FIG. 16 is a block diagram for describing the fourth embodiment of the receiver of this invention.

FIG. 16 shows a block diagram of the structure of the receiver in the fourth embodiment of this invention.

The receiver in this embodiment includes: an antenna (ANT) 0100, a low-noise amplifier (LNA) 0901, a mixer (MIX) 0902, a low-pass filter (LPF) 0903, an analog-to-digital converter (ADC) 0102, a matched filter unit (MF) 0103, a power unit (POW) 0204, a wave measurement unit (WAVE MEAS) 0105, a synchronization acquisition unit (ACQ) 0108, a first path estimator unit (FIRST PATH) 1002, a demodulator unit (DEMOD) 0110, a synch tracking unit (TRACK) 0111, a timing control unit (TIM_CTL) 0112, an AD clock generator unit (ADCLK) 0113, an oscillator unit (OSC) 0906, a 90 degree phase shifter ($\pi/2$) 0905 and a frequency deviation estimator unit (FREQ_EST) 1001. The WAVE MEAS unit 0105 includes a peak detector unit (PEAK) 0106 and a storage unit (RAM) 0107.

The ANT 0100, LNA 0901, MIX 0902, LPF 0903, ADC 0102, MF 0103, POW 0204, WAVE MEAS 0105, ACQ 0108, DEMOD 0110, TRACK 0111, TIM_CTL 0112, ADCLK 0113, OSC 0906, $\pi/2$ 0905, PEAK 0106, and the RAM 0107 in FIG. 16, all possess the same functions as the block with the same signals in FIG. 15.

The receiver in FIG. 16 receives transmit signals that are a carrier wave modulated by BPSK (Binary phase shift keying) in the modulated pulse waveform as shown for example in FIG. 20B, and a direct (spread) sequence is applied to each pulse.

The embodiment renders an effect when there is a frequency deviation between the internal oscillator clocks in the transmitter and receiver.

The synchronizing tracker unit TRACK 0111 contains a synch tracking (or slaving) function for detecting the offset or shift in the clock timing output from the ADCLK 0113 and the receive signal pulse, and correcting the ADCLK 0113 timing. The TRACK 0111 usually operates after synchronization is achieved. In this synch tracking function, in order to correct the offset or shift in the clock timing output, the frequency deviation estimator unit (FREQ_EST) 1001 is capable of estimating the frequency deviation between the transmitter and receiver. This FREQ_EST 1001 makes use of the TRACK 0111 tracking result which is the clock correction amount, to estimate the frequency deviation ($\delta$) between the transmitter and receiver. The FIRST PATH 1002 makes use of the above frequency deviation estimating result ($\delta$) to estimate the first path.

The first path estimator unit (FIRST PATH) 1002 possesses essentially the same structure as shown in FIG. 5 and FIG. 6, however the frequency deviation estimating result ($\delta$) is inputted to the output time estimator unit (ARR_PATH_CAL) 0601.

Figure 17:
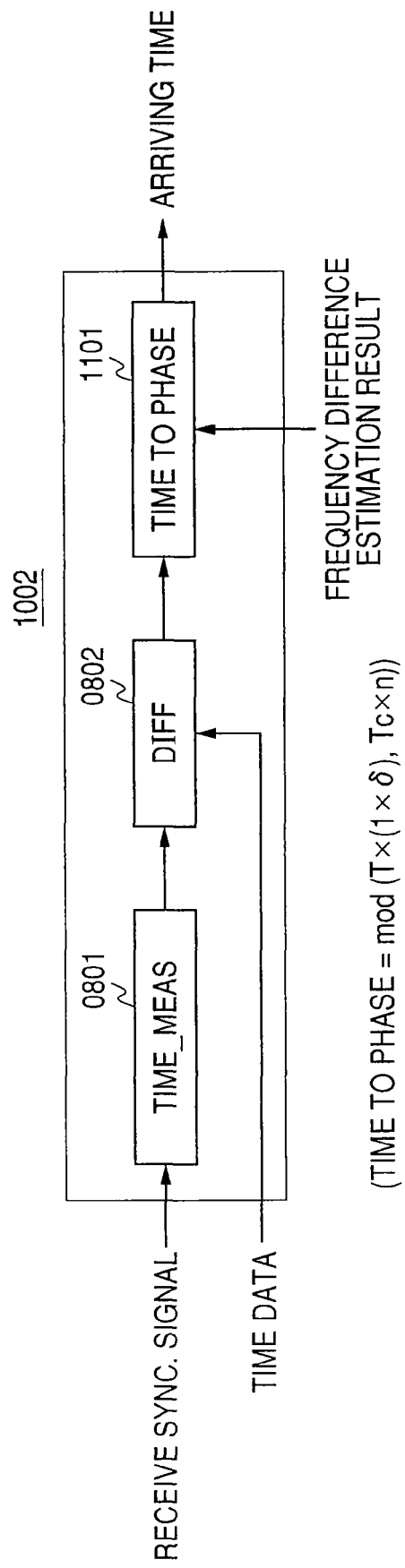
FIG. 17 is a concept diagram showing the structure of the first path estimator unit/output time estimator unit of the fourth embodiment.

FIG. 17 shows an example of the output time estimator unit within the first path estimator unit (FIRST PATH) 1002 at this time.

The output time estimator unit in FIG. 17 includes a time measurement unit (TIME_MEAS) 0801, an output time differential calculator unit (DIFF) 0802, and a time to phase converter unit (TIME TO PHASE) 1101. The TIME_MEAS 0801 and DIFF 0802 possess the same functions as sections in FIG. 14 with the same symbols.

Based on the frequency deviation estimating result ($\delta$), the time to phase converter unit (TIME TO PHASE) 1101 converts the time differential T(1−K) found in the output time differential calculator unit DIFF (0802) to a spread pulse string phase. In the operation to convert to a phase, when the pulse interval is set as tc, and the spread symbol length to Ns, then the calculation, $$\mathrm{mod}(T(1-K) \times (1+\delta), Tc \times Ns)$$

can be made. Here, mod(a,b) is the remainder where a is divided by b.

Utilizing the above structure allows estimating the output time for the first path with a simple structure, high accuracy and low power consumption, even when there is a frequency differential between the transmitter and receiver.

Utilizing the receiver of this embodiment, allows measuring the output time of the first arrival signal in the receive signal with low-speed signal processing, and renders a positioning and ranging receiver with a low-cost and low-power consumption.

Fifth Embodiment

The fifth embodiment of this invention is described next while referring to FIG. 18.

Figure 18:
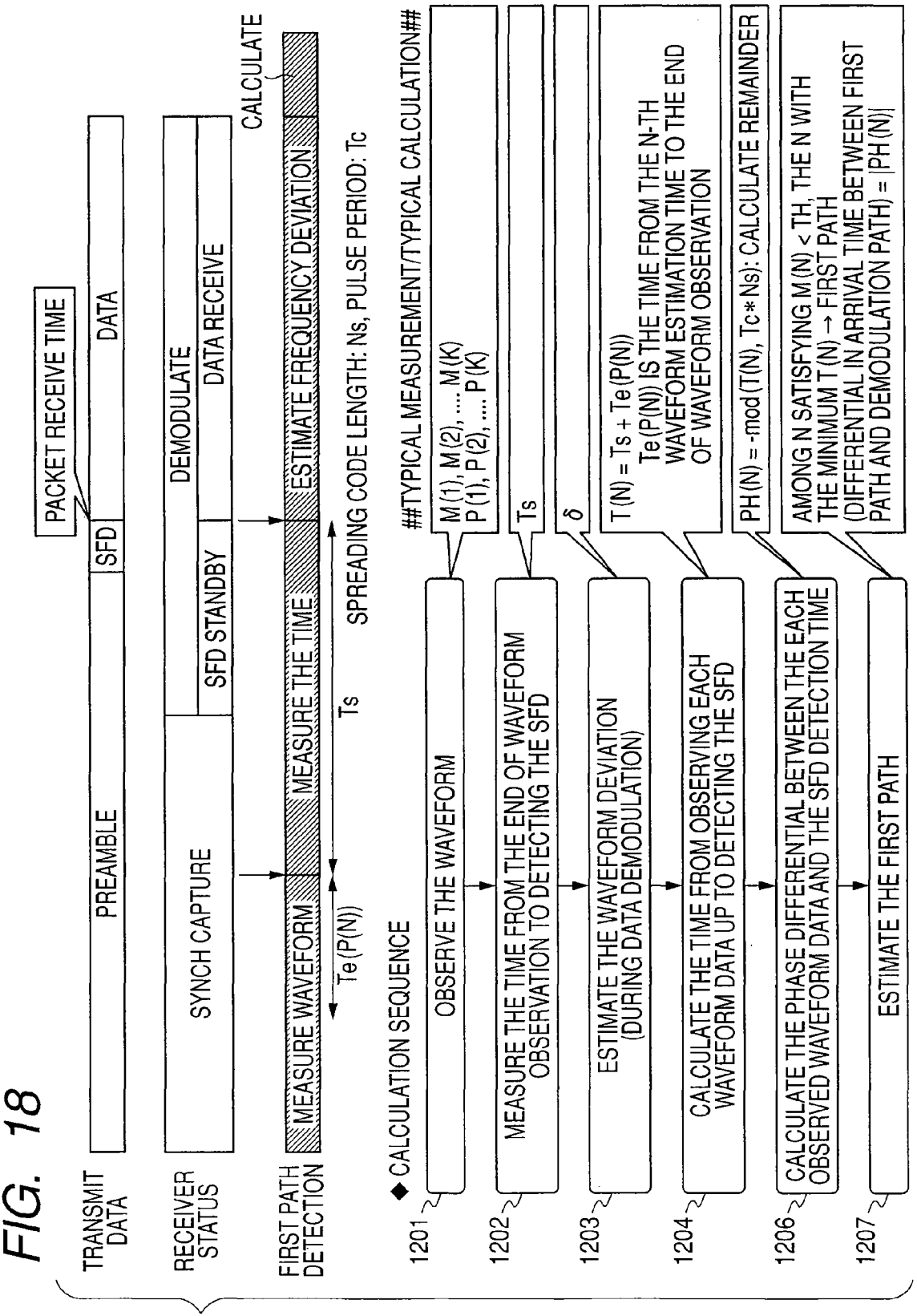
FIG. 18 is a diagram showing an overview of examples of a first path estimation sequence and calculation, per the fifth embodiment of this invention.

FIG. 18 shows a specific example of the sequence for the first path estimation process and calculation procedure when this embodiment is applied to packet communications. The transmit packet contains a preamble section, SFD section, and data section. The SFD section is a pattern with an established information format. The time the SFD section was detected is the same as the packet output time.

The processing sequence for estimating the first path is shown next. While in a state to receive the corresponding preamble in the transmit data, the receiver carries out waveform observation, and stores the AD converted waveform data (M, P) in a RAM (Step 1201) as was described for the first embodiment of this invention. At this same time, the receiver ends the synch acquisition, enters the demodulation mode, and awaits the SFD. The receiver measures the time from the time that waveform observation ends to the time the SFD unit is detected, and sets that measured value as the Ts (Step 1202). The receiver estimates the frequency deviation in the data demodulated after SFD detection, and obtains the estimation value $\delta$ (Step 1203).

Next, the receiver calculates the time T(N) from each waveform observation time to the SFD detection time (Step 1204). Here, T(N)=Ts+Te (P(N)). This Te (P(N)) is the time from the N-th waveform estimation time to the end of waveform estimation.

The receiver next calculates the phase differential PH(N) in the spread pulse string from the waveform observation time to the SFD detection time T(N) (Step 1206).

$$PH(N) = -\mathrm{mod}(T(N), Tc * Ns) : \text{Remainder calculation}$$

Finally, the receiver estimates the first path (Step 1207). In other words, the minimum N among N that satisfy M(N)>TH is set as the first path.

(Differential in arrival times between first path and demodulated path)=|PH(N)|

This invention is capable of measuring the output time of the first arrival signal in the receive signal in the packet communication with low-speed signal processing, and renders a positioning and distance-measurement receiver with a low-cost and low-power consumption.

Sixth Embodiment

The sixth embodiment of this invention is described next while referring to FIG. 19.

Figure 19:
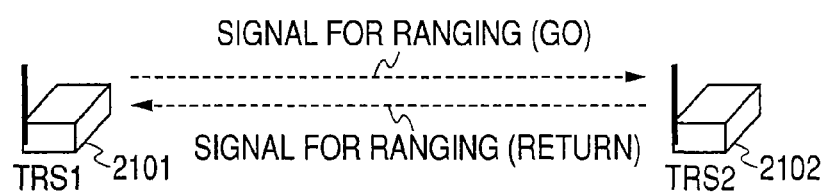
FIG. 19 is a drawing for describing the round-trip type ranging system per the fifth embodiment of this invention.

FIG. 19 shows an example of the structure of the distance-measuring system of the sixth embodiment. This distance-measuring system includes two wireless communication devices (TRS1, TRS2) 2101, 2102, and a function for finding the distance between TRS1 2101 and TRS2 2102 by measuring the round-trip time of the wireless signal. This embodiment can accurately measure the distance between the two wireless communication devices (TRS1, TRS2) by detecting an accurate round-trip time based on the first path detection function as described in the first embodiment of this invention during detection of the round-trip time of wireless signals between wireless communication devices (TRS1, TRS2).

What is claimed is:

1. A receiver comprising:
   a waveform measuring unit to perform multiple analog-to-digital conversions on the received signal while shifting the timing at each $\Delta t$ a frequency identical to the nominal pulse repetition frequency of a transmit signal made up of intermittent pulse signals subjected to direct spreading or an integer multiple of the same frequency, and at a frequency lower than the multiplicative inverse of the pulse width, and store the observation data from the receive signal in a storage area; and
   a first path estimator unit to estimate the arrival time of the first path arriving earliest time-wise in the receive signal, based on the stored observation data from the receive signal,
   wherein the observation data in the waveform measuring unit is waveform data includes:
      peak values for matched filter outputs obtained at each measurement timing by applying matched filter processing containing tap coefficients matching the spreading code applied to the data after analog-to-digital conversion of the transmit signal; and
      the output time of those peak values,
   wherein the first path estimator unit includes an output time estimator unit, a threshold comparator unit, and a minimum detector unit,
   wherein the output time estimator unit to calculate the output time differential between the demodulated path and the arrival time data T(N) for the multiple waveform data M(1−K), and waveform data for the peak values of the output time P(1−K),
   wherein the threshold comparator unit compares the waveform data M(1−K) with the specified threshold TH, and outputs the arrival time T(N) when M(N)>TH is satisfied, and
   wherein the minimum detector unit estimates the minimum value for the arrival time data T(N) as the first path.

2. The receiver according to claim 1, wherein the measurement data in the waveform measuring unit includes:
   multiple higher-ranked waveform data containing peak values for matched filter outputs obtained at each measurement timing by applying matched filter processing containing tap coefficients matching the spreading code applied to the data after analog-to-digital conversion of the transmit signals; and
   the output time of those waveform data values.

3. The receiver according to claim 1,
   wherein the first path estimator unit decides that the observation data with the earliest arrival time exceeding a preset threshold is the first path signal.

4. The receiver according to claim 1,
   wherein the first path estimator unit finds the time differential between the respective demodulated path and the output time of each peak value in the stored waveform data, and finds the arrival time matching the respective waveform data from that time differential.

5. The receiver according to claim 4,
wherein the receive signal contains a synchronization tracker unit for tracking the clock of the receiver, and
wherein the first path estimator unit estimates the frequency deviation between the receiver and the transmitter serving as the transmission source of the transmission signal from the synchronization tracker unit, and uses those frequency deviation results to correct the calculated arrival time.

6. The receiver according to claim 1,
wherein the first path estimator unit includes a threshold calculator unit, and
wherein this threshold calculator unit finds the threshold value TH from the waveform data string P(1–K) stored in the storage area.

7. The receiver according to claim 6,
wherein the threshold calculator unit finds the threshold value TH from the following formula TH=maximum value for M(1–K)/A (where A is here an appropriate constant).

8. The receiver according to claim 1,
wherein the output time calculator unit includes a time measurement unit, an output time differential calculator unit, and a time phase converter unit,
wherein the time measurement unit measures the time that the receive synchronization signal is inputted,
wherein the output time differential calculator unit calculates the differential in respective arrival times T(1–K) for the data M(1–K), and the receive synchronization signal utilizing the measurement result from the input time and the time data string P(1–k), and
wherein the time phase converter unit converts the time differential T(1–K) into a spread pulse string for the arrival time data T(N).

9. The receiver according to claim 8,
wherein the time phase converter unit converts the time differential T(1–K) into a spreading pulse string phase T(N) based on the following formula: Mod(T(1–K), TcxNs) with the pulse interval set as Tc, and the spreading code length set as Ns where the mod(a,b) is defined as a remainder in case that a is divided by b.

10. The receiver according to claim 1,
wherein the transmit/receive signal is UWB-IR, and
wherein the timing Δt that sequentially at which the receive signal analog-to-digital conversion is sequentially shifted, is a smaller value than the pulse width WTP of the UWB-IR.

11. The receiver according to claim 1, further comprising a demodulating-synchronization tracking unit for performing demodulation and synchronization processing and also generating a receive synchronizing signal.

12. A positioning system receiver comprising:
a terminal for transmitting a positioning signal;
a reference station for sending a reference signal;
a plurality of base stations for receiving the positioning signal and the reference signal; and
a positioning server for calculating the position of the terminal and a network connecting the base station with the positioning server,
wherein each base station comprises:
a waveform observation unit to perform multiple analog-to-digital conversions on the received signal while shifting the timing at each Δt a frequency identical to the nominal pulse repetition frequency of a transmit signal made up of intermittent pulse signals subjected to direct spreading, or an integer multiple of the same frequency, and at a frequency lower than the multiplicative inverse of the pulse width, and storing the peak value at each timing as receive signal observation data in a storage area;
a first path estimator unit for estimating the arrival time of the first path arriving earliest time-wise in the receive signal, based on the stored multiple arrival time observation data;
a time differential measurement unit for measuring the receive time differential between the reference signal and the positioning signal by using the clock signal, based on the first path arrival time of each receive signal; and
a transmit unit for transmitting the time information containing the differentials in receive times to the positioning server,
wherein the positioning server comprises a position calculator unit to calculate the position of the terminal based on the time transmitted from each base station, and
wherein the observation data in the waveform measurement unit includes:
waveform data that are peak values for matched filter outputs obtained at each measurement timing by applying matched filter processing containing tap coefficients matching the spreading code applied to the data after analog-to-digital conversion to the transmit signal; and
the output times for those peak values, and
wherein the arrival time of the first path arriving earliest time-wise in the receive signal is estimated by rearranging the arrival times of peak value output times in the waveform data, based on the arrival time data, and
wherein the first path estimator unit includes an output time estimator unit, a threshold comparator unit, and a minimum detector unit,
wherein the output time estimator unit to calculate the output time differential between the demodulated path and the arrival time data T(N) for the multiple waveform data M(1–K), and waveform data for the peak values of the output time P(1–K),
wherein the threshold comparator unit compares the waveform data M(1–K) with the specified threshold TH, and outputs the arrival time T(N) when M(N)>TH is satisfied, and
wherein the minimum detector unit estimates the minimum value for the arrival time data T(N) as the first path.

13. The positioning system receiver according to claim 12,
wherein the first path estimator in each base station decides that the observation data with the earliest arrival time exceeding a preset threshold is the first path signal.

14. The positioning system receiver according to claim 12,
wherein the first path estimator unit in each base station, finds the time differential between the respective demodulated path and the output time of each peak value in the stored waveform data, and finds the arrival time matching the respective waveform data, from that time differential.

15. The positioning system receiver according to claim 12,
wherein each base station contains a synchronization tracker unit for tracking the clock of the receiver in the receive signal, and
wherein the first path estimator unit estimates the frequency deviation between the receiver and the transmitter serving as the transmission source of the transmission signal from the synchronization tracker unit, and uses those frequency deviation results to correct the calculated arrival time.

16. A positioning method for a terminal in a wireless device including a terminal for transmitting a positioning signal, a reference station for sending a reference signal and, multiple base stations for receiving the positioning signal and the reference signal and, a positioning server for calculating the position of the terminal and a network connecting the positioning server with the base station, the positioning method comprising the steps of:

in each base station,
performing multiple analog-to-digital conversions on the received signal while shifting the timing at each $\Delta t$ a frequency identical to the nominal pulse repetition frequency of a transmit signal made up of intermittent pulse signals subjected to direct spreading, or an integer multiple of the same frequency, and at a frequency lower than the multiplicative inverse of the pulse width, and storing the peak value at each timing as receive signal observation data in a storage area;
estimating the arrival time of the first path arriving earliest time-wise in the receive signal based on the stored multiple arrival time observation data;
measuring the receive time differential between the reference signal and the positioning signal by using the clock signal based on the first path arrival time of each receive signal; and
transmitting the time information containing the differential in receive times to the positioning server, and in the positioning server,
calculating the position of the terminal based on the time transmitted from each base station,
wherein a transmit packet for packet communication comprises a preamble section, SFD section, and data section, the SFD section being a pattern with an established information format, and
wherein the positioning method further comprising the steps of
storing the AD converted waveform data (M, P) is stored in a RAM;
measuring the time from the time that waveform observation ends to the time the SFD unit is detected to set measured value as Ts;
estimating the frequency differentials from the data being demodulated after SFD detection to find the estimation value $\delta$;
calculating the time $T(N)=Ts+Te$ $(P(N))$ from each waveform observation time to the SFD detection time;
calculating the phase differential PH(N) in the spreading pulse string from each waveform observation time until the SFD detection time; and
estimating the minimum N among N that satisfy $M(N)>TH$ as the first path.

* * * * *